(12) United States Patent
Kanigan et al.

(10) Patent No.: US 8,105,554 B2
(45) Date of Patent: Jan. 31, 2012

(54) NANOLITER ARRAY LOADING

(75) Inventors: Tanya S. Kanigan, Lexington, MA (US); Steve Smith, Arlington, MA (US); John Linton, Lincoln, MA (US); Robert Hess, Arlington, MA (US); Karl Yoder, Stoneham, MA (US); Colin Brennan, Marblehead, MA (US)

(73) Assignee: Life Technologies Corporation, Carlsbad, CA (US)

( * ) Notice: Subject to any disclaimer, the term of this patent is extended or adjusted under 35 U.S.C. 154(b) by 1257 days.

(21) Appl. No.: 11/078,196

(22) Filed: Mar. 11, 2005

(65) Prior Publication Data

US 2007/0003448 A1   Jan. 4, 2007

Related U.S. Application Data

(60) Provisional application No. 60/552,267, filed on Mar. 12, 2004, provisional application No. 60/607,838, filed on Sep. 8, 2004, provisional application No. 60/627,334, filed on Nov. 12, 2004.

(51) Int. Cl.
   *B01L 3/00* (2006.01)

(52) U.S. Cl. ............ 422/504; 422/67; 422/400; 506/33; 137/67

(58) Field of Classification Search .......... None
   See application file for complete search history.

(56) References Cited

U.S. PATENT DOCUMENTS

| | | |
|---|---|---|
| 1,236,137 A | 8/1917 | Bastow |
| 2,745,001 A | 5/1956 | Guth |
| 2,771,398 A | 11/1956 | Snyder |
| 3,043,669 A | 7/1962 | Charles |
| 3,170,980 A | 2/1965 | Pritchard |
| 3,252,331 A | 5/1966 | Lancaster |
| 3,705,451 A * | 12/1972 | Dahlgren ................ 29/895.32 |
| 3,768,974 A | 10/1973 | Storm |
| 3,770,383 A | 11/1973 | Price |
| 3,864,512 A | 2/1975 | Meadow |
| 3,873,268 A | 3/1975 | McKie, Jr. |
| 3,894,512 A | 7/1975 | Ohno et al. |
| 3,997,396 A | 12/1976 | Delente |
| 4,007,010 A | 2/1977 | Woodbridge, III |
| 4,065,263 A | 12/1977 | Woodbridge, III |
| 4,088,448 A | 5/1978 | Lilja et al. |
| 4,110,165 A | 8/1978 | Cole et al. |

(Continued)

FOREIGN PATENT DOCUMENTS

DE        100 46 224        3/2002

(Continued)

OTHER PUBLICATIONS

Adam Steel et al, The Flow-Thru Chip: A Three-Dimensional Biochip Platform, in Microarray Biochip Technology 87-117 (Mark Schena ed. 2000).

(Continued)

*Primary Examiner* — In Suk Bullock
*Assistant Examiner* — Timothy G Kingan

(57) ABSTRACT

An interface is provided for storing microfluidic samples in a nanoliter sample chip. A fluid access structure provides a fluid access region to a selected subset of sample wells from an array of sample wells. A fluid introduction mechanism introduces a sample fluid to the fluid access region so that the sample wells in the selected subset are populated with the sample fluid without the unselected sample wells being populated with the sample fluid.

40 Claims, 11 Drawing Sheets

U.S. PATENT DOCUMENTS

| | | |
|---|---|---|
| 4,111,754 A | 9/1978 | Park |
| 4,234,316 A | 11/1980 | Hevey |
| 4,273,877 A | 6/1981 | Anagnostopoulos |
| 4,415,732 A | 11/1983 | Caruthers et al. |
| 4,446,239 A | 5/1984 | Tsuji et al. |
| 4,453,805 A | 6/1984 | Ashkin et al. |
| 4,458,066 A | 7/1984 | Caruthers et al. |
| 4,493,815 A | 1/1985 | Fernwood et al. |
| 4,500,707 A | 2/1985 | Caruthers et al. |
| 4,562,045 A | 12/1985 | Murata et al. |
| 4,562,871 A | 1/1986 | Astle |
| 4,586,546 A | 5/1986 | Mezei et al. |
| 4,613,573 A | 9/1986 | Shibayama et al. |
| 4,626,509 A | 12/1986 | Lyman |
| 4,659,677 A | 4/1987 | Glover et al. |
| 4,663,163 A | 5/1987 | Hou et al. |
| 4,678,894 A | 7/1987 | Shafer |
| 4,682,890 A | 7/1987 | de Macario et al. |
| 4,682,891 A | 7/1987 | de Macario et al. |
| 4,683,195 A | 7/1987 | Mullis et al. |
| 4,683,202 A | 7/1987 | Mullis |
| 4,701,304 A | 10/1987 | Horn et al. |
| 4,722,515 A | 2/1988 | Ham |
| 4,734,192 A | 3/1988 | Champion et al. |
| 4,761,378 A | 8/1988 | Godsey |
| 4,828,386 A | 5/1989 | Matkovich et al. |
| 4,834,946 A | 5/1989 | Levin |
| 4,861,448 A | 8/1989 | Cantor et al. |
| 4,861,722 A | 8/1989 | Sano et al. |
| 4,869,114 A | 9/1989 | Kido et al. |
| 4,873,633 A | 10/1989 | Mezei et al. |
| 4,893,886 A | 1/1990 | Ashkin et al. |
| 4,932,806 A | 6/1990 | Eklund et al. |
| 4,965,188 A | 10/1990 | Mullis et al. |
| 4,973,679 A | 11/1990 | Caruthers et al. |
| 4,990,459 A | 2/1991 | Maeda et al. |
| 5,000,921 A | 3/1991 | Hanaway et al. |
| 5,009,846 A | 4/1991 | Gavet et al. |
| 5,038,852 A | 8/1991 | Johnson et al. |
| 5,041,266 A | 8/1991 | Fox |
| 5,047,215 A | 9/1991 | Manns |
| 5,100,627 A | 3/1992 | Buican et al. |
| 5,108,704 A | 4/1992 | Bowers et al. |
| 5,108,926 A | 4/1992 | Klebe |
| 5,152,060 A | 10/1992 | Schubert et al. |
| 5,153,319 A | 10/1992 | Caruthers et al. |
| 5,175,209 A | 12/1992 | Beattie et al. |
| 5,192,980 A | 3/1993 | Dixon et al. |
| 5,204,268 A | 4/1993 | Matsumoto |
| 5,210,021 A | 5/1993 | Goodwin, Jr. |
| 5,215,593 A | 6/1993 | Nojo et al. |
| 5,219,727 A | 6/1993 | Wang et al. |
| 5,229,163 A | 7/1993 | Fox |
| 5,234,665 A | 8/1993 | Ohta et al. |
| 5,234,666 A | 8/1993 | Suzuki et al. |
| 5,242,974 A | 9/1993 | Holmes |
| 5,262,128 A | 11/1993 | Leighton et al. |
| 5,284,753 A | 2/1994 | Goodwin, Jr. |
| 5,290,705 A | 3/1994 | Davis |
| 5,310,652 A | 5/1994 | Gelfand et al. |
| 5,322,019 A | 6/1994 | Hyland |
| 5,322,770 A | 6/1994 | Gelfand |
| 5,333,675 A | 8/1994 | Mullis et al. |
| 5,373,803 A | 12/1994 | Noguchi et al. |
| 5,374,525 A | 12/1994 | Lalouel et al. |
| 5,382,985 A | 1/1995 | Becker et al. |
| 5,407,800 A | 4/1995 | Gelfand et al. |
| 5,411,876 A | 5/1995 | Bloch et al. |
| 5,427,908 A | 6/1995 | Dower et al. |
| 5,433,975 A | 7/1995 | Roberts et al. |
| 5,443,791 A | 8/1995 | Cathcart et al. |
| 5,445,934 A | 8/1995 | Fodor et al. |
| 5,453,252 A | 9/1995 | Truett |
| 5,455,008 A | 10/1995 | Earley et al. |
| 5,466,583 A | 11/1995 | Thomson et al. |
| 5,475,610 A | 12/1995 | Atwood et al. |
| 5,476,744 A | 12/1995 | Anno et al. |
| 5,476,774 A | 12/1995 | Wang et al. |
| 5,491,083 A | 2/1996 | Arentzen et al. |
| 5,492,806 A | 2/1996 | Drmanac et al. |
| 5,504,007 A | 4/1996 | Haynes |
| 5,506,141 A | 4/1996 | Weinreb et al. |
| 5,508,197 A | 4/1996 | Hansen et al. |
| 5,508,200 A | 4/1996 | Tiffany et al. |
| 5,510,270 A | 4/1996 | Fodor et al. |
| 5,519,218 A | 5/1996 | Chang |
| 5,525,464 A | 6/1996 | Drmanac et al. |
| 5,538,848 A | 7/1996 | Livak et al. |
| 5,554,339 A | 9/1996 | Cozzette et al. |
| 5,560,811 A | 10/1996 | Briggs et al. |
| 5,561,058 A | 10/1996 | Gelfand et al. |
| 5,561,071 A | 10/1996 | Hollenberg et al. |
| 5,576,220 A | 11/1996 | Hudson et al. |
| 5,580,717 A | 12/1996 | Dower et al. |
| 5,585,275 A | 12/1996 | Hudson et al. |
| 5,593,839 A | 1/1997 | Hubbell et al. |
| 5,599,664 A | 2/1997 | Schwartz |
| 5,602,756 A | 2/1997 | Atwood et al. |
| 5,605,662 A | 2/1997 | Heller et al. |
| 5,609,828 A | 3/1997 | O'Bear et al. |
| 5,621,094 A | 4/1997 | Roser et al. |
| 5,632,957 A | 5/1997 | Heller et al. |
| 5,641,391 A | 6/1997 | Hunter et al. |
| 5,641,864 A | 6/1997 | Gelfand |
| 5,656,493 A | 8/1997 | Mullis et al. |
| 5,667,972 A | 9/1997 | Drmanac et al. |
| 5,670,329 A | 9/1997 | Oberhardt |
| 5,710,381 A | 1/1998 | Atwood et al. |
| 5,720,923 A | 2/1998 | Haff et al. |
| 5,722,370 A | 3/1998 | Koike et al. |
| 5,744,101 A | 4/1998 | Fodor et al. |
| 5,763,263 A | 6/1998 | Dehlinger |
| 5,770,440 A | 6/1998 | Berndt |
| 5,770,860 A | 6/1998 | Franzen et al. |
| 5,773,238 A | 6/1998 | Shukla |
| 5,780,233 A | 7/1998 | Guo et al. |
| 5,785,926 A | 7/1998 | Seubert et al. |
| 5,786,226 A | 7/1998 | Bocker et al. |
| 5,795,748 A | 8/1998 | Cottingham |
| 5,807,522 A | 9/1998 | Brown et al. |
| 5,840,862 A | 11/1998 | Bensimon et al. |
| 5,843,767 A | 12/1998 | Beattie |
| 5,849,598 A | 12/1998 | Wilson et al. |
| 5,856,100 A | 1/1999 | Hayashizaki |
| 5,869,006 A | 2/1999 | Fanning et al. |
| 5,871,908 A | 2/1999 | Henco et al. |
| 5,879,632 A | 3/1999 | Demers |
| 5,888,723 A | 3/1999 | Sutton et al. |
| 5,897,842 A | 4/1999 | Dunn et al. |
| 5,906,683 A | 5/1999 | Chen et al. |
| 5,910,287 A | 6/1999 | Cassin et al. |
| 5,922,604 A | 7/1999 | Stapleton et al. |
| 5,928,907 A | 7/1999 | Woudenberg et al. |
| 5,929,208 A | 7/1999 | Heller et al. |
| 5,942,432 A | 8/1999 | Smith et al. |
| 5,944,652 A | 8/1999 | Miller et al. |
| 5,955,377 A | 9/1999 | Maul et al. |
| 5,958,345 A | 9/1999 | Turner et al. |
| 5,962,316 A | 10/1999 | Beach et al. |
| 5,985,214 A | 11/1999 | Stylli et al. |
| 5,994,056 A | 11/1999 | Higuchi |
| 6,001,586 A | 12/1999 | Schellenberger |
| 6,004,744 A | 12/1999 | Goelet et al. |
| 6,015,880 A | 1/2000 | Baldeschwieler et al. |
| 6,020,141 A | 2/2000 | Pantoliano et al. |
| 6,024,925 A | 2/2000 | Little et al. |
| 6,027,873 A | 2/2000 | Schellenberger et al. |
| 6,060,240 A | 5/2000 | Kamb et al. |
| 6,071,702 A | 6/2000 | Yamamoto et al. |
| 6,071,748 A | 6/2000 | Modlin et al. |
| 6,083,682 A | 7/2000 | Campbell et al. |
| 6,083,763 A | 7/2000 | Balch |
| 6,086,825 A | 7/2000 | Sundberg et al. |
| 6,088,100 A | 7/2000 | Brenan et al. |
| 6,090,251 A | 7/2000 | Sundberg et al. |
| 6,103,199 A | 8/2000 | Bjornson et al. |
| 6,103,479 A | 8/2000 | Taylor |

| | | | | | | |
|---|---|---|---|---|---|---|
| 6,107,059 | A | 8/2000 | Hart | 6,848,462 B2 | 2/2005 | Covington et al. |
| 6,121,048 | A | 9/2000 | Zaffaroni et al. | 6,849,127 B2 | 2/2005 | Vann et al. |
| 6,132,685 | A | 10/2000 | Kercso et al. | 6,858,185 B1 | 2/2005 | Kopf-Sill et al. |
| 6,136,566 | A | 10/2000 | Sands et al. | 6,878,554 B1 | 4/2005 | Schermer et al. |
| 6,136,592 | A | 10/2000 | Leighton | 6,893,877 B2 | 5/2005 | Hunter et al. |
| H001919 | H | 11/2000 | Caspar et al. | 7,133,726 B1 | 11/2006 | Atwood et al. |
| 6,147,198 | A | 11/2000 | Schwartz | 7,211,148 B2 | 5/2007 | Bryning et al. |
| 6,149,787 | A | 11/2000 | Chow et al. | 7,223,363 B2 | 5/2007 | McNeely et al. |
| 6,149,815 | A | 11/2000 | Sauter | 7,300,798 B2 | 11/2007 | Perbost et al. |
| 6,174,670 | B1 | 1/2001 | Wittwer et al. | 7,332,271 B2 | 2/2008 | O'Keefe et al. |
| 6,197,563 | B1 | 3/2001 | Erlich et al. | 7,390,457 B2 | 6/2008 | Schembri |
| 6,215,894 | B1 | 4/2001 | Zeleny et al. | 2001/0036718 A1 * | 11/2001 | Williams ............... 438/597 |
| 6,235,473 | B1 | 5/2001 | Friedman et al. | 2001/0046702 A1 | 11/2001 | Schembri |
| 6,245,505 | B1 | 6/2001 | Todd et al. | 2001/0053334 A1 | 12/2001 | Chen et al. |
| 6,251,343 | B1 | 6/2001 | Dubrow et al. | 2001/0055765 A1 | 12/2001 | O'Keefe et al. |
| 6,271,024 | B1 | 8/2001 | Sve et al. | 2002/0001544 A1 | 1/2002 | Hess et al. |
| 6,274,089 | B1 | 8/2001 | Chow et al. | 2002/0001546 A1 * | 1/2002 | Hunter et al. ............ 422/102 |
| 6,284,113 | B1 | 9/2001 | Bjornson et al. | 2002/0003177 A1 | 1/2002 | O'Connor et al. |
| 6,296,702 | B1 | 10/2001 | Bryning et al. | 2002/0015994 A1 | 2/2002 | Schellenberger et al. . 435/287.1 |
| 6,306,578 | B1 | 10/2001 | Schellenberger et al. | 2002/0049196 A1 | 4/2002 | Carpino et al. |
| 6,309,600 | B1 | 10/2001 | Hunter | 2002/0072096 A1 | 6/2002 | O'Keefe et al. |
| 6,309,828 | B1 | 10/2001 | Schleifer et al. | 2002/0094533 A1 | 7/2002 | Hess et al. ............... 435/6 |
| 6,312,103 | B1 | 11/2001 | Haluzak | 2002/0110900 A1 | 8/2002 | Jovanovich et al. |
| 6,326,083 | B1 | 12/2001 | Yang et al. | 2002/0119578 A1 | 8/2002 | Zaffaroni et al. |
| 6,337,435 | B1 | 1/2002 | Chu et al. | 2002/0151040 A1 | 10/2002 | O'Keefe et al. |
| 6,353,774 | B1 | 3/2002 | Goldenberg et al. | 2002/0176804 A1 | 11/2002 | Strand et al. |
| 6,376,256 | B1 | 4/2002 | Dunnington et al. | 2002/0192716 A1 | 12/2002 | Schellenberger et al. |
| 6,387,331 | B1 | 5/2002 | Hunter | 2003/0003036 A1 | 1/2003 | Rouleau et al. |
| 6,391,559 | B1 | 5/2002 | Brown et al. | 2003/0039585 A1 | 2/2003 | Freeman ............... 422/83 |
| 6,399,396 | B1 | 6/2002 | Bass | 2003/0064507 A1 | 4/2003 | Gallagher et al. |
| 6,399,952 | B1 | 6/2002 | Maher et al. | 2003/0080087 A1 | 5/2003 | Stelzle |
| 6,404,166 | B1 | 6/2002 | Puchianu et al. | 2003/0108726 A1 | 6/2003 | Schembri et al. |
| 6,406,869 | B1 | 6/2002 | Glickman et al. | 2003/0119042 A1 | 6/2003 | Franco De Sarabia Rosado et al. |
| 6,410,331 | B1 | 6/2002 | Schultz et al. | 2003/0124716 A1 | 7/2003 | Hess et al. |
| 6,429,025 | B1 | 8/2002 | Parce et al. | 2003/0170610 A1 | 9/2003 | Cima et al. |
| 6,436,632 | B2 | 8/2002 | Schellenberger et al. | 2003/0180807 A1 | 9/2003 | Hess et al. |
| 6,447,661 | B1 | 9/2002 | Chow et al. | 2003/0186350 A1 | 10/2003 | Newell |
| 6,451,188 | B1 | 9/2002 | Sundberg et al. | 2003/0207099 A1 | 11/2003 | Gillmor et al. |
| 6,454,924 | B2 | 9/2002 | Jedrzejewski et al. | 2003/0219716 A1 | 11/2003 | Avdeef et al. |
| 6,468,761 | B2 | 10/2002 | Yang et al. | 2004/0023223 A1 | 2/2004 | Thompson et al. |
| 6,485,690 | B1 | 11/2002 | Pfost et al. | 2004/0037748 A1 | 2/2004 | Hasan et al. |
| 6,485,944 | B1 | 11/2002 | Church et al. | 2004/0109793 A1 | 6/2004 | McNeely et al. |
| 6,495,104 | B1 | 12/2002 | Unno et al. | 2004/0132040 A1 | 7/2004 | Hamill |
| 6,495,369 | B1 | 12/2002 | Kercso et al. | 2004/0141880 A1 | 7/2004 | Handler et al. |
| 6,496,369 | B2 | 12/2002 | Nakamura et al. | 2004/0171166 A1 | 9/2004 | Hunter |
| 6,503,757 | B1 | 1/2003 | Chow | 2004/0191924 A1 | 9/2004 | Hunter et al. |
| 6,509,059 | B2 | 1/2003 | Yang et al. | 2004/0208792 A1 | 10/2004 | Linton et al. |
| 6,514,750 | B2 | 2/2003 | Bordenkircher et al. | 2004/0209303 A1 | 10/2004 | Martin |
| 6,544,737 | B1 | 4/2003 | Blumenfeld et al. | 2004/0235005 A1 | 11/2004 | Friedlander et al. |
| 6,551,836 | B1 | 4/2003 | Chow et al. | 2004/0241636 A1 | 12/2004 | Michnick et al. |
| 6,565,813 | B1 | 5/2003 | Garyantes | 2005/0059074 A1 | 3/2005 | Schellenberger et al. |
| 6,572,828 | B1 | 6/2003 | Potyrailo et al. | 2005/0079105 A1 | 4/2005 | Hunter et al. |
| 6,576,478 | B1 | 6/2003 | Wagner et al. | 2005/0092351 A1 * | 5/2005 | Saito et al. ............... 134/33 |
| 6,579,358 | B2 | 6/2003 | Delucas et al. | 2005/0118073 A1 | 6/2005 | Facer et al. |
| 6,579,367 | B2 | 6/2003 | Vann et al. | 2005/0130213 A1 | 6/2005 | Morrison |
| 6,582,914 | B1 | 6/2003 | Caldwell et al. | 2005/0148066 A1 | 7/2005 | O'Keefe et al. |
| 6,630,835 | B2 | 10/2003 | Cheng et al. | 2005/0214173 A1 | 9/2005 | Facer et al. |
| 6,632,629 | B2 | 10/2003 | Yang et al. | 2005/0220675 A1 | 10/2005 | Reed et al. |
| 6,638,761 | B2 | 10/2003 | Shin et al. | 2005/0266582 A1 | 12/2005 | Modlin et al. |
| 6,642,000 | B1 | 11/2003 | Strizhkov et al. | 2006/0057209 A1 | 3/2006 | Chapman et al. |
| 6,649,402 | B2 | 11/2003 | Van der Weide et al. | 2006/0105433 A1 | 5/2006 | Bickmore et al. |
| 6,660,367 | B1 | 12/2003 | Yang et al. | 2006/0183171 A1 | 8/2006 | Schellenberger et al. |
| 6,664,044 | B1 | 12/2003 | Sato et al. | 2006/0194108 A1 | 8/2006 | Drews et al. |
| 6,677,151 | B2 | 1/2004 | Sandell | 2008/0108112 A1 | 5/2008 | O'Keefe et al. |
| 6,682,702 | B2 | 1/2004 | Barth et al. | | | |
| 6,689,323 | B2 | 2/2004 | Fisher et al. | | | |

FOREIGN PATENT DOCUMENTS

| | | |
|---|---|---|
| EP | 0 236 069 | 9/1987 |
| EP | 0 402 888 | 12/1990 |
| EP | 0 506 993 | 10/1992 |
| EP | 0506993 | 10/1992 |
| EP | 0 882 593 A1 | 12/1998 |
| EP | 1 155 742 | 11/2001 |
| JP | 63107057 | 5/1988 |
| JP | 2000-28623 | 1/2000 |
| JP | 2000-88863 | 3/2000 |
| JP | 2000-287670 | 10/2000 |
| JP | 2001/083163 | 3/2001 |
| JP | 2001-211873 | 8/2001 |
| JP | 2002-27984 | 1/2002 |

| | | | |
|---|---|---|---|
| 6,703,236 | B2 | 3/2004 | Atwood |
| 6,706,538 | B1 | 3/2004 | Karg et al. |
| 6,713,309 | B1 | 3/2004 | Anderson et al. |
| 6,716,629 | B2 | 4/2004 | Hess et al. |
| 6,730,883 | B2 | 5/2004 | Brown et al. |
| 6,737,026 | B1 | 5/2004 | Bergh et al. |
| 6,743,633 | B1 | 6/2004 | Hunter |
| 6,812,030 | B2 | 11/2004 | Ozbal et al. |
| 6,821,486 | B1 | 11/2004 | Akporiaye et al. |
| 6,827,831 | B1 | 12/2004 | Chow et al. |
| 6,841,193 | B1 | 1/2005 | Yang et al. |
| 6,841,663 | B2 | 1/2005 | Lefkowitz et al. |
| 6,844,161 | B2 | 1/2005 | Siani et al. |

| | | |
|---|---|---|
| JP | 2002-189033 | 7/2002 |
| WO | 91/13335 | 9/1991 |
| WO | WO-9501559 | 1/1995 |
| WO | WO-9511755 | 5/1995 |
| WO | WO-97/00941 | 1/1997 |
| WO | WO-97/00943 | 1/1997 |
| WO | WO-97/15394 | 5/1997 |
| WO | WO-9715394 | 5/1997 |
| WO | WO-97/36167 | 10/1997 |
| WO | WO-97/37036 | 10/1997 |
| WO | WO-98/45406 | 10/1998 |
| WO | WO-98/47003 | 10/1998 |
| WO | WO-99/11373 | 3/1999 |
| WO | WO-99/19510 | 4/1999 |
| WO | WO-99/34920 | 7/1999 |
| WO | WO-99/39829 | 8/1999 |
| WO | WO-9939829 | 8/1999 |
| WO | WO-99/47922 | 9/1999 |
| WO | WO-99/52560 | 10/1999 |
| WO | WO-99/55461 | 11/1999 |
| WO | WO-99/61152 A1 | 12/1999 |
| WO | WO-00/01798 | 1/2000 |
| WO | WO-00/51735 | 9/2000 |
| WO | WO-00/56456 | 9/2000 |
| WO | WO-01/38583 | 5/2001 |
| WO | WO-01/61054 | 8/2001 |
| WO | WO-01/87335 | 11/2001 |
| WO | WO-02/26394 | 4/2002 |
| WO | WO-02/30561 | 4/2002 |
| WO | WO-02/40158 | 5/2002 |
| WO | WO02/48676 | 6/2002 |
| WO | WO-02/055199 | 7/2002 |
| WO | WO02/072264 | 9/2002 |
| WO | WO-02/078834 | 10/2002 |
| WO | WO 02/078834 A2 | 10/2002 |
| WO | WO-02/087764 | 11/2002 |
| WO | WO-02/089982 | 11/2002 |
| WO | WO 02/089982 A2 | 11/2002 |
| WO | WO-03/002226 | 1/2003 |
| WO | WO-03/035239 | 5/2003 |
| WO | WO-03/042697 | 5/2003 |
| WO | WO 03/042697 A1 | 5/2003 |
| WO | WO-2004/018104 | 3/2004 |
| WO | WO-2004/074818 A2 | 9/2004 |

OTHER PUBLICATIONS

Ausubel, et al., "Current Protocols in Molcular Biology" iii-xii (1987).
3 Birren et al., "Genome Analysis: A Laboratory Manual" v-xiv (1999).
4 Birren et al., "Genome Analysis: A Laboratory Manual" v-xii (1999).
Sambrook, et al., "Molecular Cloning: A Laboratory Manual," xi-xxxviii (2d ed. 1989).
Gait, "Oligonucleotide Synthesis: A Practical Approach," vii-xiii (1984).
Maniatis et al., "Molecular Cloning: A Laboratory Manual" v-x (1982).
Taylor et al., "Optimization of the Performance of the Polymerase Chain Reaction in Silicon-Based Microstructures," 25 (15) Nucleic Acids Research 3164-68 (1997).
Eckstein, "Oligonucleotides and Analogues: A Practical Approach" ix-xvii (1991).
Gregory G. Lennon, "High-throughout gene expression analysis for drug discovery", 5(2) Drug Discovery Today 59-66 (Feb. 2000).
de Macario et al., "Slide Immunoenzymatic Assay for Human IgE(SIA-IgE)," 90 J. Immunological Methods 137-41 (1986).
Tian-Lu Cheng & Steve Roffler, "Membrane-Tethered Proteins for Basic Research, Imaging and Therapy", 28(6) Medicinal Research Reviews 886-928 (2008).
CRC Handbook of Chemistry and Physics, F-20-F-35 (Robert C. Weast, Ph.D, ed. 1984-1985).
Adlercreutz et al., "Oxygen Supply to Immobilized Cells," *European Journal of Applied Microbiology Biotechnology*, vol. 16 pp. 165-170 (1982).

Cadus, Cadus Pharmaceutical Corp, 1997 Annual Report, 1-29, May 8, 1998.
Wittwer et al., "The Light Cycler: A Microvolume Multisample Fluorimeter with Rapid Temperature Control", BioTechniques 176-81 (Jan. 1997).
Erfle et al., "Simultaneous loading of 200 sample lanes for DNA sequencing on vertical and horizontal standard and ultrathin gels", Oxford University Pres, 1997, vol. 25, No. 11, pp. 2229-2230.
MacBeath et al., "Printing Proteins as Microarrays for high-Throughout Function Determination", Science, Sep. 2000, vol. 289, pp. 1760-1762.
Singh-Gasson et al., "Maskless fabrication of light-directed oligonucleotide microarrays using a digital micromirror array", Nature Biotechnology, Oct. 1999, vol. 17, pp. 974-978.
Vogelstein et al., "Digital PCR", Pro. Natl. Acad. Sci USA., Aug. 1999, vol. 96, pp. 9236-9241.
Smith et al., "Dynamical Scaling of DNA Diffusion Coefficients", Macromolecules, 1996, vol. 29, pp. 1372-1373.
Thorstenson et al., "Global Analysis of ATM Polymorphism Reveals Significant Functional Constraint", Am. J. Hum. Genet., 2001, vol. 69, pp. 396-412.
Wittwer et al., "Continuous Fluorescence Monitoring of Rapid Cycle DNA Amplification", BioTechniques, Jan. 1997, vol. 22, pp. 130-138.
Kanigan et al., "Living Chips for Drug Discovery", Mar. 2000, Proceedings of SPIE, vol. 3926, pp. 172-180.
Matsubara, Y. et al., "Microchamber Array Based DNA Quantification and Specific Sequence Detection from a Single Copy Via PCR in Nanoliter Volumes Biosensors and Bioelectronics" 20, 1482-1490 (2005).
Colin J. Brenan et al., "A massively parallel microfluidics platform for storage and ultra high throughput screening," 4626 Proc. SPIE 560-69 (2002).
Luke Sosnowski, "Manufacturing Methods for High Density Micro-Channel Arrays" (Jun. 2000) (Master's Thesis) (Massachusetts Institute of Technology Dep't of Mechanical Engineering).
Arndt et al., A Rapid Genetic Screening System for Identifying Gene-Specific Suppression Constructs for use in Human Cells, ;vol. 28, No. 6., pp. e15-i-viii (2000).
Rolls et al., A Visual Screen of GFP-Fusion Library Identifies a New Type of Nuclear Envelope Membrane Protein, ;vol. 146, No. 1, pp. 29-43 (1999).
Sieweke, Direction of Transcription Factor Partners with a Yeast One Hybrid Screen, ;vol. 130, pp. 59-77 (2000).
Zhao et al., Directed Evolution Converts Subtilisin E into a Functional Equivalent of Thermitase, vol. 12, No. 1, pp. 47-53 (1999).
T.B. Jones et al., Dielectrophoretic Liquid Actuation and Nanodroplet Formation, 99(2) J. Applied Phys. 1441-42 (Jan. 15, 2001).
R. Moerman et al., Miniaturized Electrospraying as a Technic for the Production of Microarrays of Reproducible Micrometer Sized Protein Spots, in Micro Total Analysis Systems 2000: Proceedings of the µ TAS 2000 Symposium 14-18 (May 2000).
A.D. Sauter, Nanoliters onto media: Use of Electric Induction, American Laboratory 40-45 (Oct. 2001).
J. Vykoukal et al., A Programmable Dielectrophoretic Fluid Processor for Droplet-Based Chemistry, 2001.
Prescott et al., Microbiology 31, 114-16 (1990).
J.H. Brown, Charts for Counting Bacterial Colonies, 37 Am. J. Pub. Health Nations Health 206-07 (1947).
Polokoff et al., "Isolation of Somatic Cell Mutants Defective in the Biosynthesis fo Phoshatidylethanolamine", 256 J. Biological Chem. 7687-90 (1981).
Coleman et al., "Phospholipid Synthesis in Isolated Fat Cells", 252 J. Biological Chem. 3050-56 (1977).
Colin S. Cooper, "Applications of microarray technology in breast cancer research", 3(3) Breast Cancer Res. 158-75 (2001).
Elizabeth Zubritsky, "Spotting a microarray system", 4(5) Modern Drug Discovery 59-71 (May 2001).
S.D. Gillmor et al., "Low-Contact-Angle Polydimethyl Siloxane (PDMS) Membranes for Fabricating Micro-Bioarrays", Proc. 2d Ann. Int'l IEEE-EMBS Spec. Topic Conf. on Microtechnologies in Med. & Bio. 51 (A. Dittmar, ed. 2002).

de Macario et al., "The slide immunoenzymatic assay: a simple laboratory tool with multiple applications", Chemical Abstr. 67622t (1985).

de Macario et al., "Slide Immunoenzymatic Assay (SAI) in Hybridoma Technology", 121 Methods in Ezymology 509-25 (1986).

de Macario et al., "Adaptation of the Slide Immuneozymatic Assay for Quantification of DNA Hybridization: SIA-DNA", 8 Biotechniques 210-17 (1990).

L.J. Kricka & P. Wilding, Microchip PCR, 377 Anal. Bioanal. Chem. 820-25 (2003).

A.F.R. Huhmer & J.P. Landers, Noncontact Infrared-Mediated Thermocycling for Effective Polymerase Chain Reaction Amplification of DNA in Nanoliter Volumes, 72 Anal. Chem. 5507-12 (2000).

Mann A. Shoffner et al. Chip PCR. I. Surface passivation of microfabricated silicon-glss chips for PCR, 24(2) Nucleic Acids Research 375-79 (1996).

Da-Sheeng Lee et al., A novel real-time PCR machine with a miniature spectrometer for fluorescence sensing in a micro liter volue glass capillary, 100 Sensors and Actuators B 401-10 (2004).

Nagai, H. et al., "High-Throughput PCR in Silicon Based Mcrochanber Array Biosensors & Bioelectronics" 16, 1015-1019 (2001).

Nagai, H. et al., "Development of a Microchamber Array for Picoliter PCR", Anal. Chem. 73, 1043-1047 (2001).

Matsubara, Y., et al., "On-chip Nanoliter-Volume Multiplex TaqMan Polymerase Chain Reaction From a Single Copy Based on Counting Fluorescence Released from Microchambers", Anal. Chem. 21, 6434-6439 (2004).

* cited by examiner

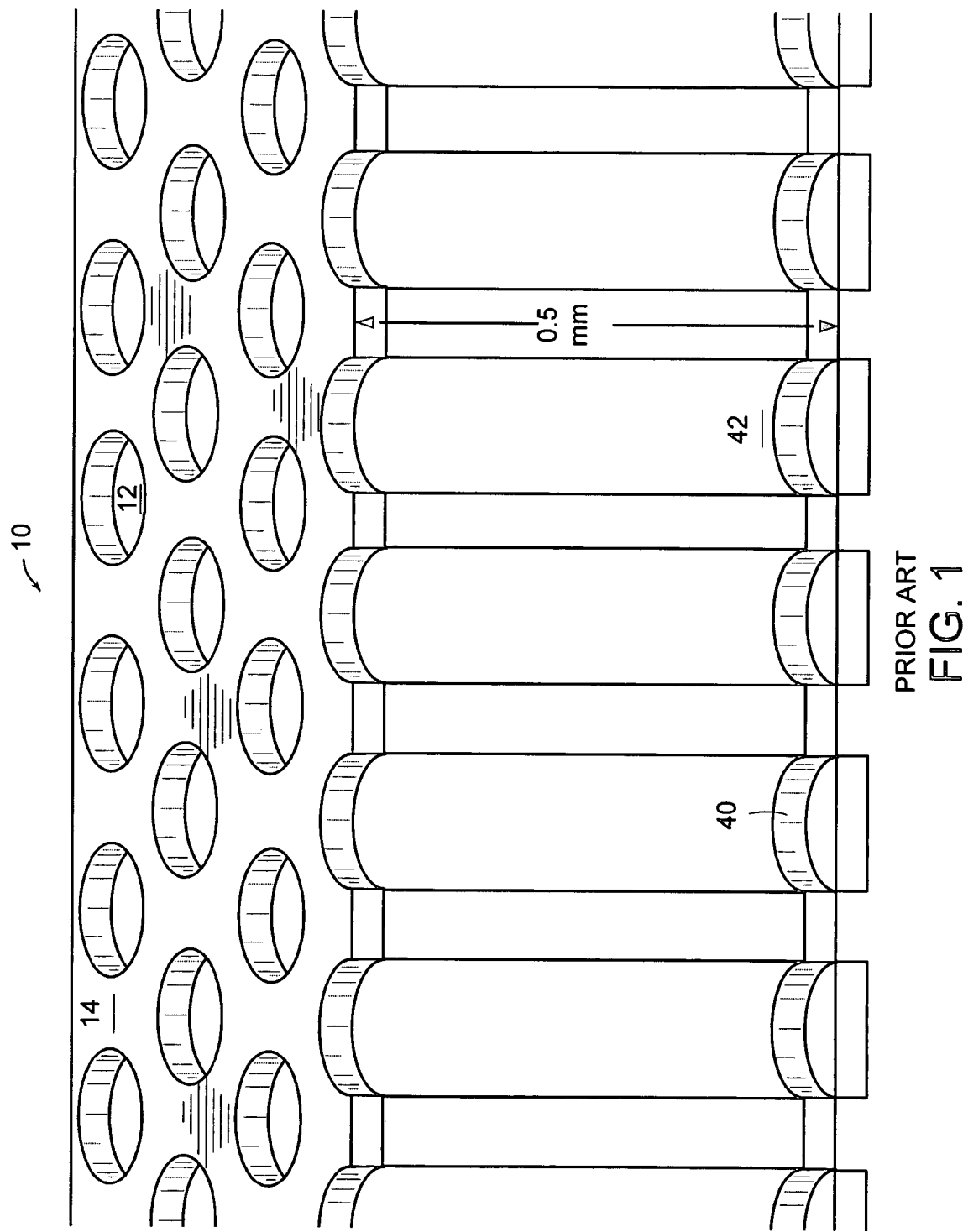

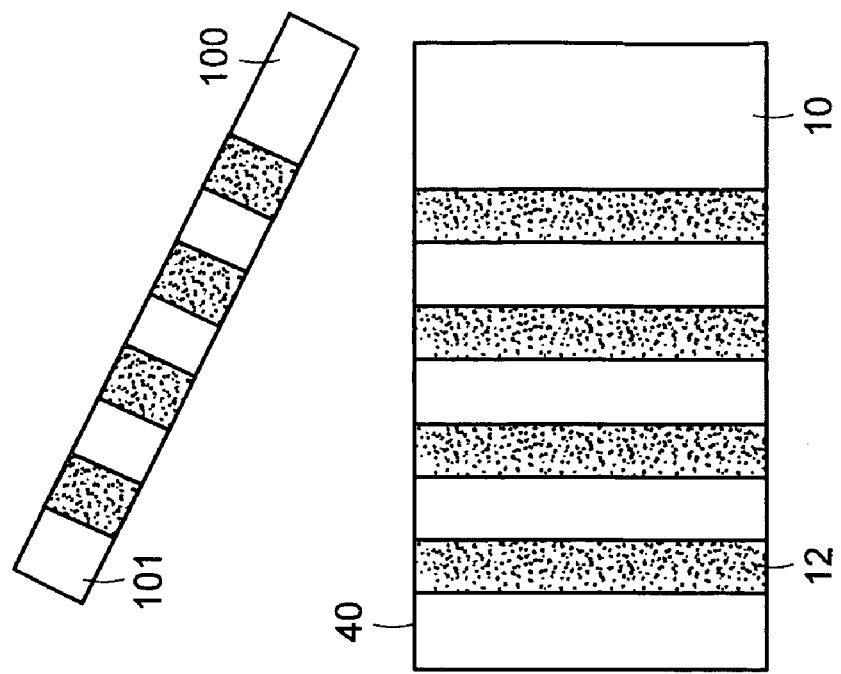
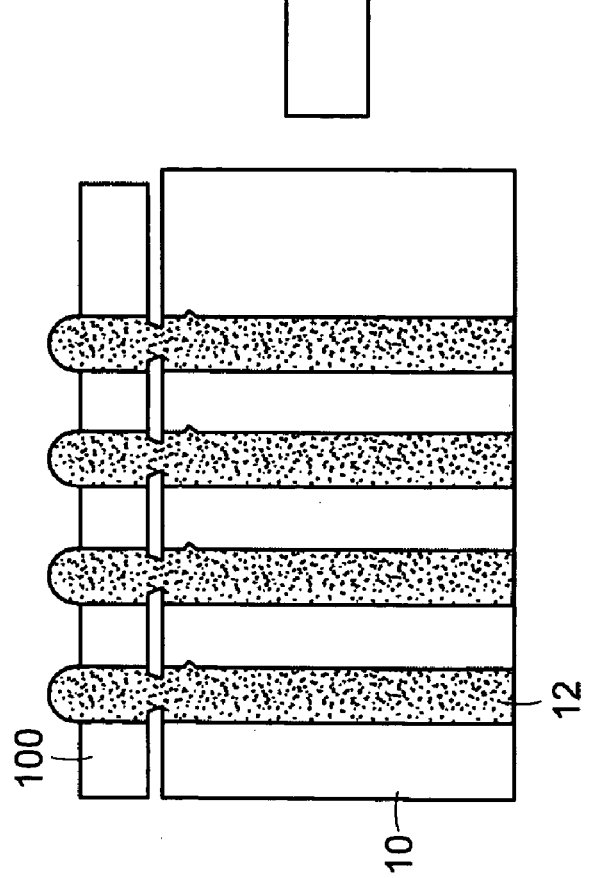
FIG. 10A
FIG. 10B

NANOLITER ARRAY LOADING

This application claims priority from U.S. Provisional Patent Application 60/552,267, filed Mar. 12, 2004; U.S. Provisional Patent Application 60/607,838, filed Sep. 8, 2004; and U.S. Provisional Patent Application 60/627,334, filed Nov. 12, 2004; all of which are incorporated herein by reference.

FIELD OF THE INVENTION

The invention generally relates to techniques for assaying sample liquids, and more specifically to techniques for utilizing a sub-set of nanoliter sample volumes in an array.

BACKGROUND ART

Various systems are known for performing a large number of chemical and biological storage assays and synthesis operations. One approach uses an assay chip having an array of nanoliter volume through-hole sample wells with hydrophilic interiors and openings surrounded by hydrophobic material. One specific commercial example of a nanoliter chip system is the Living Chip™ made by BioTrove, Inc. of Woburn, Mass. Nanoliter chip technology relies on the ability to handle very small volumes of fluid samples, typically, 100 nanoliters or less. The various considerations taken into account in handling such small liquid samples are known as microfluidics.

FIG. 1 shows a cut away view of a typical nanoliter sample chip. This is described, for example, in U.S. Pat. No. 6,387,331 and U.S. Patent Application 20020094533, the contents of which are incorporated herein by reference. Array chip 10 contains an array of through-hole sample wells 12 that traverse the chip 10 from one planar surface 14 to the other opposing planar surface (not shown).

The sample wells 12 may be grouped into sub-arrays such as by controlling the spacing between the wells. For example, FIG. 2 shows a chip 10 in which the sample wells 12 are grouped into a 4 by 12 array of 5-well by 5-well sub-arrays 20. In another embodiment, the sub-arrays 20 may be 8-wells by 8-wells or any other convenient number. The chip 10 in FIG. 2 is 1"×3" to correspond to a standard microscope slide. The sample wells 12 in a sub-array 20 may be laid out in a square or rectangular grid arrangement as shown in FIG. 2, or the rows and/or columns of sample wells may be offset as shown in FIG. 1.

The sample chip 10 typically may be from 0.1 mm to more than 10 mm thick; for example, around 0.3 to 1.52 mm thick, and commonly 0.5 mm. Typical volumes of the through-hole sample wells 12 could be from 0.1 picoliter to 1 microliter, with common volumes in the range of 0.2-100 nanoliters, for example, about 35 nanoliters. Capillary action or surface tension of the liquid samples may be used to load the sample wells 12. For typical chip dimensions, capillary forces are strong enough to hold liquids in place. Chips loaded with sample solutions can be waved around in the air, and even centrifuged at moderate speeds without displacing samples.

To enhance the drawing power of the sample wells 12, the target area of the receptacle, interior walls 42, may have a hydrophilic surface that attracts a sample fluid. It is often desirable that the surfaces be bio-compatible and not irreversibly bind biomolecules such as proteins and nucleic acids, although binding may be useful for some processes such as purification and/or archiving of samples. Alternatively, the sample wells 12 may contain a porous hydrophilic material that attracts a sample fluid. To prevent cross-contamination (crosstalk), the exterior planar surfaces 14 of chip 10 and a layer of material 40 around the openings of sample wells 12 may be of a hydrophobic material such as a monolayer of octadecyltrichlorosilane (OTS). Thus, each sample well 12 has an interior hydrophilic region bounded at either end by a hydrophobic region.

The through-hole design of the sample wells 12 avoids problems of trapped air inherent in other microplate structures. This approach together with hydrophobic and hydrophilic patterning enable self-metered loading of the sample wells 12. The self-loading functionality helps in the manufacture of arrays with pre-loaded reagents, and also in that the arrays will fill themselves when contacted with an aqueous sample material.

It has been suggested that such nanoliter chips can be utilized for massively parallel assays such as Polymerase Chain Reaction (PCR) and Enzyme-Linked Immunosorbent Assay (ELISA) analysis. However, one problem with such applications of nanoliter chips is the complex time-consuming preparation and processing of the chip that is required. Before the samples are introduced, each sample well must be pre-formatted with the necessary probes, reagents, etc., which will be referred to generally as reagents. Such chip preparation will be referred to as formatting. Once the chip is formatted, the analyte or specimen must be introduced into each well, which will be referred to as sample loading. The term sample will be used to refer generically to both specimens and reagents. Transferring of large collections of fluid samples such as libraries of small molecule drug candidates, cells, probe molecules (e.g., oligomers), and/or tissue samples stored in older style 96- or 384-well plates into more efficient high density arrays of nanoliter receptacles can be difficult. As a practical matter, there tend to be two approaches to formatting and loading of nanoliter sample chips—bulk transfer and discrete transfer.

An example of bulk transfer is dipping a sample chip into a reservoir of sample liquid. The sample liquid wicks into the sample wells by capillary action and all of the wells fill uniformly with the sample.

One established method for discrete transfer uses a transfer pin loaded with the transfer liquid. For example, pins or arrays of pins are typically used to spot DNA samples onto glass slides for hybridization analysis. Pins have also been used to transfer liquids such as drug candidates between microplates or onto gels (one such gel system is being developed by Discovery Partners, San Diego, Calif.). Many pin types are commercially available, of various geometries and delivery volumes. V&P Scientific of San Diego, Calif. makes slotted, grooved, cross-hatched, and other novel-geometry pins. The Stealth Pin by ArrayIt is capable of delivering hundreds of spots in succession from one sample uptake, with delivery volumes of 0.5 nL to 2.5 nL. Majer Precision Engineering sells pins having tapered tips and slots such as the MicroQuil 2000. Techniques for using a one or more pins to transfer sample liquid are described in U.S. patent application Ser. No. 10/227,179, filed Aug. 23, 2002, and incorporated herein by reference.

SUMMARY OF THE INVENTION

Representative embodiments of the present invention include methods and systems for providing an interface for storing microfluidic samples in a nanoliter sample chip. A fluid access structure provides a fluid access region to a selected subset of sample wells from an array of sample wells. A fluid introduction mechanism introduces a sample fluid to the fluid access region so that the sample wells in the selected subset are populated with the sample fluid without the unselected sample wells being populated with the sample fluid.

In further embodiments, the fluid access structure may be adapted for positioning next to a planar surface of the array to provide the fluid access region. The fluid access structure may include at least one microfluidic circuit for distributing the sample fluid to the fluid access region, which may be fixed to the array or detachable from the array.

In another embodiment, the fluid access structure may be adapted to fold a portion of the array to provide the fluid access region. For example, the fluid access structure may be adapted to fit into a microplate sample well so as to enable introducing a sample fluid within the microplate sample well into the fluid access region.

In other embodiments, the fluid access structure may include a mask to create a barrier between the fluid access region and the rest of the array. Or a printing plate may be used as the fluid access structure and the fluid introduction mechanism. The fluid introduction mechanism may be based on dragging a drop of the sample fluid over the fluid access region. Or the fluid introduction mechanism may be adapted for dispensing a focused drop of the sample fluid into the fluid access region, such as by spraying. In various embodiments, a sponge or a pipette may be used for the fluid introduction mechanism.

In another embodiment, a membrane is used as the fluid access structure and fluid introduction mechanism. The membrane may include an outer surface having patterned hydrophobic and hydrophilic regions Embodiments also include a kit for storing microfluidic samples. The kit contains any of the interfaces described above as well as a chip containing the array of sample wells. In such a kit, the interface may further contains a reagent for the wells in the selected subset of sample wells. For example, the reagent may be a dye for staining the sample fluid populated into the subset of wells.

BRIEF DESCRIPTION OF THE DRAWINGS

FIG. 10 shows an embodiment in which a porous membrane serves as an interface loader mechanism.

DETAILED DESCRIPTION OF SPECIFIC EMBODIMENTS

Figure 2:
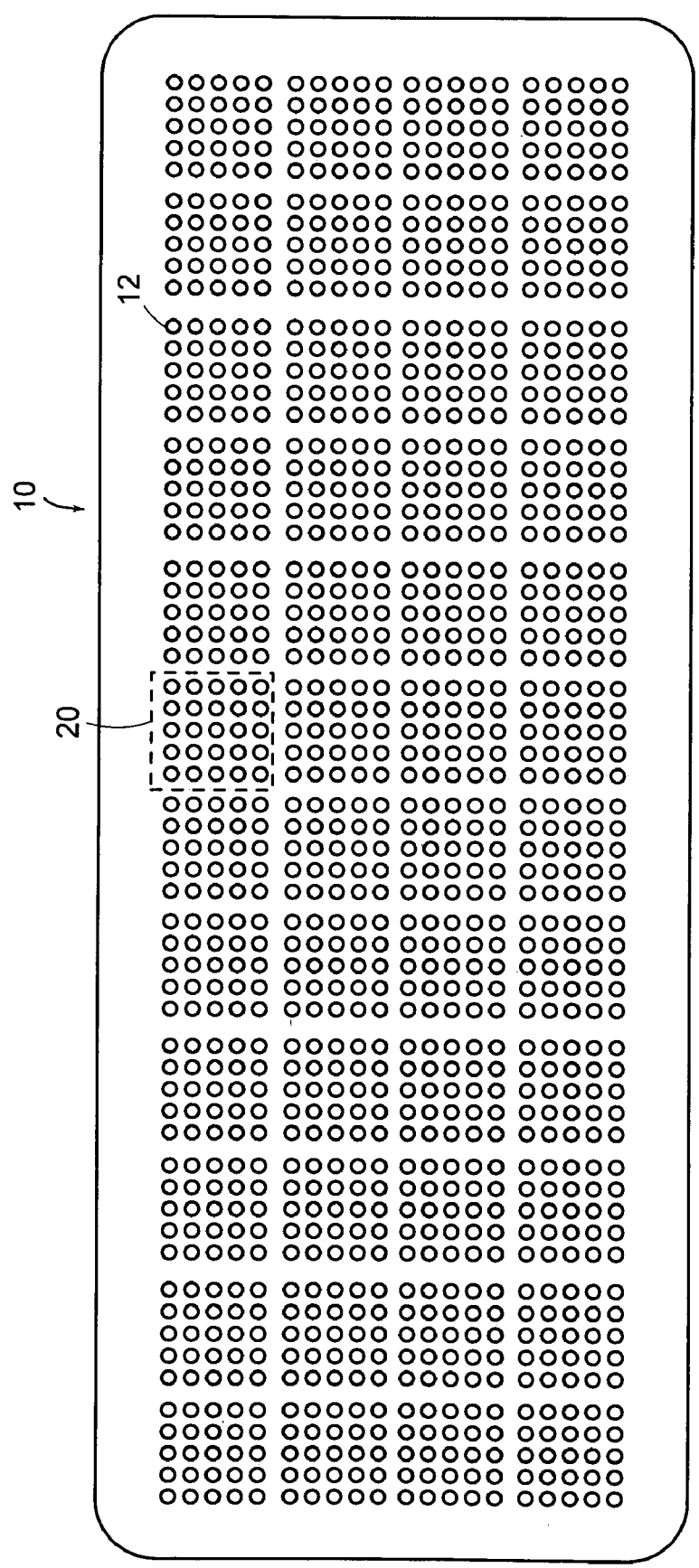
FIG. 2 shows a top plan view of a chip according to FIG. 1 in which the array of sample wells is grouped into sub-arrays.

Various embodiments of the present invention are directed to providing an interface for storing microfluidic samples in an array of through-hole sample wells. A fluid access structure provides a fluid access region to a selected subset of sample wells. A fluid introduction mechanism introduces a sample fluid to the fluid access region so that the sample wells in the selected subset are populated with the sample fluid without the unselected sample wells being populated with the sample fluid.

A variety of factors affect how specific embodiments are realized. Among these is the need for uniformity—the specific process should approach the uniformity of batch loading techniques, with minimal fluidics errors (e.g., less than 1% of the selected sample wells fail to properly load the sample fluid). Also, dead volume (unused sample fluid left in the loading interface) should be minimized to the extent possible; in efficient embodiments, dead volume may be less than 10% of the total sample fluid volume. In addition, cross-contamination (cross-talk) needs to be avoided between the selected sample wells and the unselected sample wells.

Other factors that influence specific embodiments include specific details of the intended application. For example, whether manual loading or robotic loading will be used to provide sample fluid to the fluid introduction mechanism, the sample source structure (e.g., 384-well microplate), and compatibility with other handling procedures such as use of perfluorinated liquids. Also, the amount of space between adjacent sub-arrays affects susceptibility to cross-talk.

After the sample fluid has been loaded into the wells in the subset (sub-array), the loader interface containing the fluid access structure and the fluid introduction mechanism may be removed, for example by peeling or prying it off the surface of the sample chip. In one embodiment, the sample chip and loader interface come packaged together as a kit in which the loader interface is pre-affixed to the sample chip ensuring proper alignment between the two. In some specific embodiments, it may be useful to provide reagents in a dry form on the walls of the interface loader structures. Structures associated with a given sub-array may have the same reagent or different reagents. The reagents may be encapsulated in a gel or wax such as polyethylene glycol (PEG). For example, a fluorescent dye may be coated on the interior walls of a loader interface so that when a biochemical sample such as nucleic acids, cells, or proteins are added to a given sub-array, they are stained with the dye.

In one specific embodiment, the fluid access structure is adapted for positioning next to a planar surface of the sample chip to provide the fluid access region, for example, by providing at least one microfluidic circuit for distributing the sample fluid to the fluid access region. Such a microfluidic circuit may be based on microfluidic channels in the fluid access structure such that the channels overlay and connect the openings of the subset of sample wells in the fluid access region. The fluid introduction mechanism may be a port or reservoir that supplies sample fluid to the channels. For example, a pipette or micro-syringe may provide sample fluid to a fluid introduction mechanism such as a docking port that receives the sample fluid. The docking port connects with the access structure channels that form the fluid access region. The sample fluid in the channels then is populated into the selected subset of sample wells in the sample chip. In various embodiments, there may be one docking port per channel, or a plurality of docking ports per channel.

The microfluidic channels, while open on the bottom side that faces the sample chip, may be either closed or open on top. Channels that are open on the top have the advantage of being easier to load by hand or with a robotic dispensing station having ordinary precision, since a droplet need only contact the microfluidic circuit fluid access structure at any position on the structure. Open-top structures are typically easily produced from rigid materials such as steel, titanium, glass or silicon but these rigid structures may be expensive as in the case of silicon, or of insufficient flatness and flexibility to provide intimate contact with the underlying array as in the case of steel. A closed-top structure may be easier to manufacture from elastomeric materials, but may require the use of ports and docking of dispensers to those ports as well as regulation of the pressure applied by the dispensers. The fluid access structure may be produced from various materials, including without limitation metal, plastic, and glass. In one specific embodiment, silicon was used to fabricate the fluid access structure and was found to be easy to handle, with good rigidity, but also relatively fragile, easily breakable, and expensive to produce. One way to benefit from the rigidity and open top design of hard materials with the intimate fluidic contact of soft or elastomeric materials is to coat a structure produced with a hard material such as steel with a soft material such as PDMS.

Another embodiment may be based on metal such as stainless steel. Steel is easy to handle, inexpensive, and possesses excellent rigidity and strength. Steel also is hydrophilic, which helps hold the sample fluid in the channels. To avoid cross-talk, a steel fluid access structure may include a hydrophobic monolayer surface coating, such as of octadecyltrichlorosilane (OTS). To promote good wetting properties and biocompatibility of the inside walls of a microfluidic circuit, these may be selectively coated with a hydrophilic material. The hydrophilic material may, without limitation, be a deposition of hydrophilic and preferably biocompatible wax such as polyethylene glycol (PEG), or a covalently linked coating such as a silane bearing PEG moieties.

The channels in a steel fluid access structure can be produced by various different methods such as etching or Electrical Discharge Machining (EDM). EDM uses high-energy electric current to melt the base metal for burr-free machining. Wire EDM can produce intricate patterns and complex shapes with great precision and minimal variation.

Figure 3A:
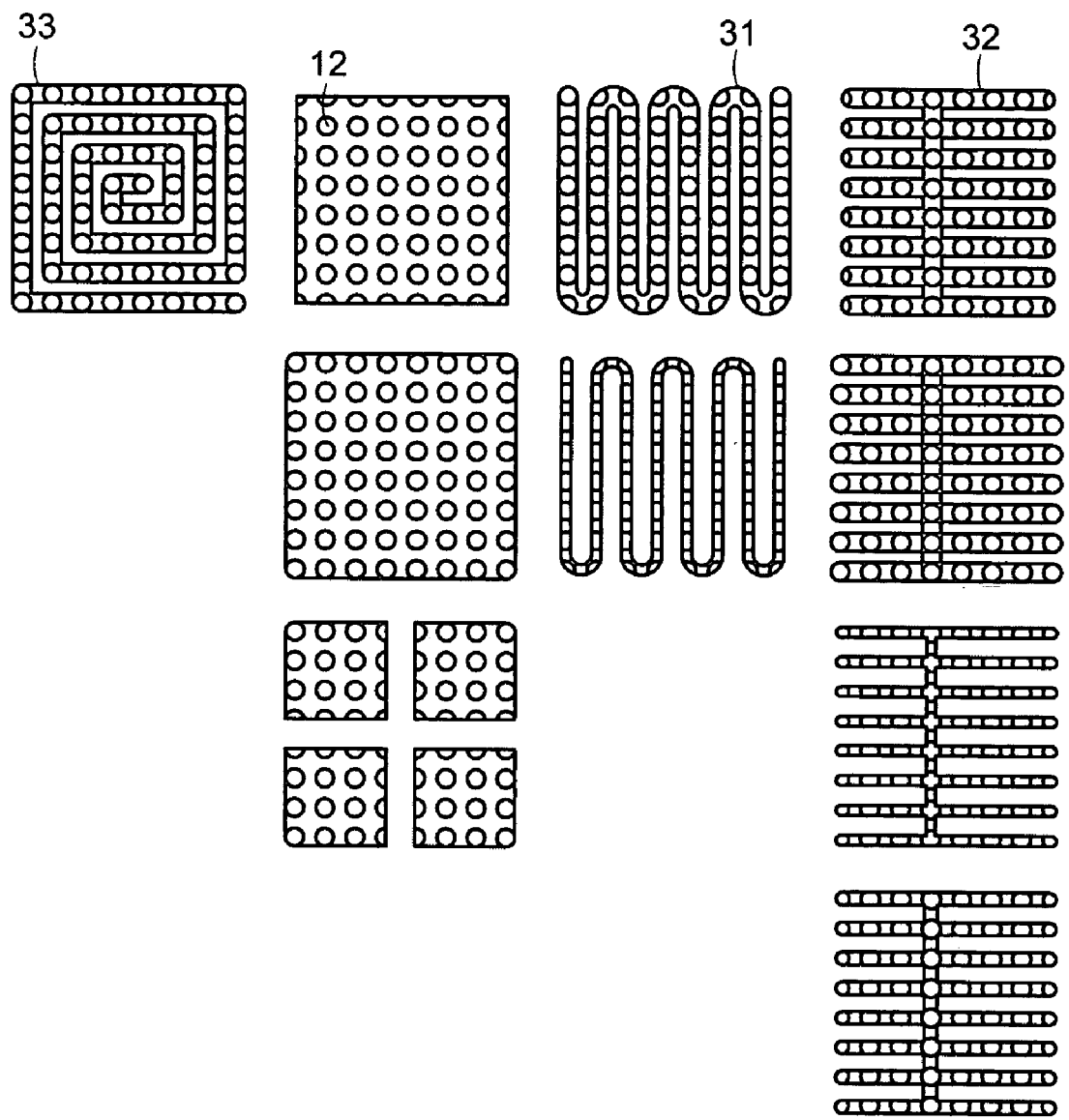
FIG. 3 shows various details of channel geometry for use in a fluid access structure.

FIG. 3A shows some examples of various channel shapes for use in a fluid access structure. The chip sample wells 12 are the small holes seen in FIG. 3A. Among the channel shapes are a serpentine geometry 31, an irrigation row geometry 32, and a spiral geometry 33. There may be a fluid introduction mechanism such as a docking port and sample reservoir connected to a point in a given geometry. Then, the sample fluid is delivered from the fluid introduction mechanism to the microfluidic channel(s) of the fluid access structure. As the sample fluid travels down the channel over the opening of a sample well, it is wicked into the well by capillary action to fill a volume of the sample well with the sample fluid.

Figure 3B:
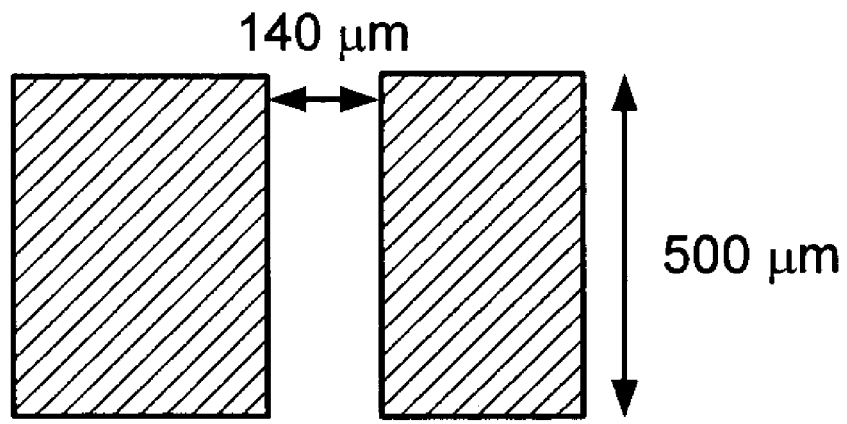
Figure 3C:
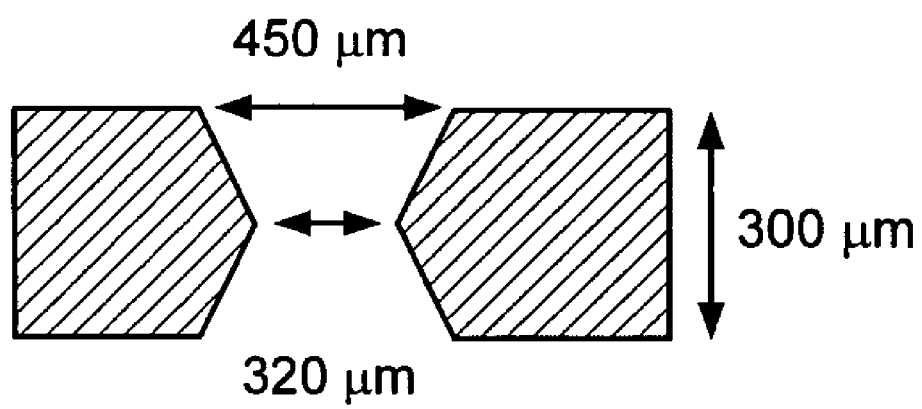

Depending on the specific channel shape, and other factors such as the geometry of the sample chip, the width of the fluid access structure channels needs to be properly dimensioned to be neither too narrow nor too wide. FIGS. 3B and 3C show cross-sectional views of two different channels. FIG. 3B shows a sample loader interface that is 500 µm thick having a 140 µm wide channel with perpendicular walls. FIG. 3C shows a sample loader interface that is 300 µm thick having hourglass-shaped channel walls that are 320 µm thick at the center and 450 µm thick at the surface. In one specific embodiment, the width of the channels may be the same as the diameter of the sample well openings. In another embodiment, the channels are narrower than the diameter of the sample well openings. In some geometries, thinner channels may be preferred as providing better sample transfer characteristics, and channels that are too wide may have problems filling spontaneously with sample fluid from a pipette, or may not transfer sample fluid is efficiently to an adjacent sample chip. In some embodiments, the fluid access structure is the same thickness as the sample chip, so that there is a 1:1 aspect ratio between the sample wells and the microcircuit channels, e.g., both the fluid access structure and the sample chip may be 300 µm thick. Also the thicker the fluid access structure is, the greater the undesirable dead volume of untransferred sample fluid may be. Thicker fluid access structures may also be harder to load with sample fluid.

It is important to obtain good planar surface contact between the sample chip and the fluid access structure. Poor contact may result in inconsistent loading and other problems. It may be more or less difficult to fabricate some materials in the desired geometries and dimensions with the necessary flatness and rigidity. Moreover, some materials may be more prone to being deformed when handled. Some materials may have issues with burrs and other fabrication irregularities that may interfere with proper operation.

One means to enhance contact is to apply pressure to press the sample chip and the fluid access structure together, for example by clamping. In some embodiments, magnetic materials may assist in forming proper surface contact between the sample chip and the fluid access structure. Gaskets may also be useful for connecting the chip and the fluid access structure. For example, an elastomeric polymer such as Polydimethylsiloxane (PDMS) may be used as a gasket in some embodiments. In other embodiments, a sandwiched layer of PDMS usefully connects the planar surface of the sample chip and the fluid access structure.

In another embodiment, the sample loader interface itself may be based on a elastomeric material such as PDMS. That is, the channels of the fluid access structure and the sample receiving port of the fluid introduction mechanism may be cast in PDMS. PDMS is naturally soft and tacky, and it can cast fine features in the range of 10-50 µm.

Figure 4A:
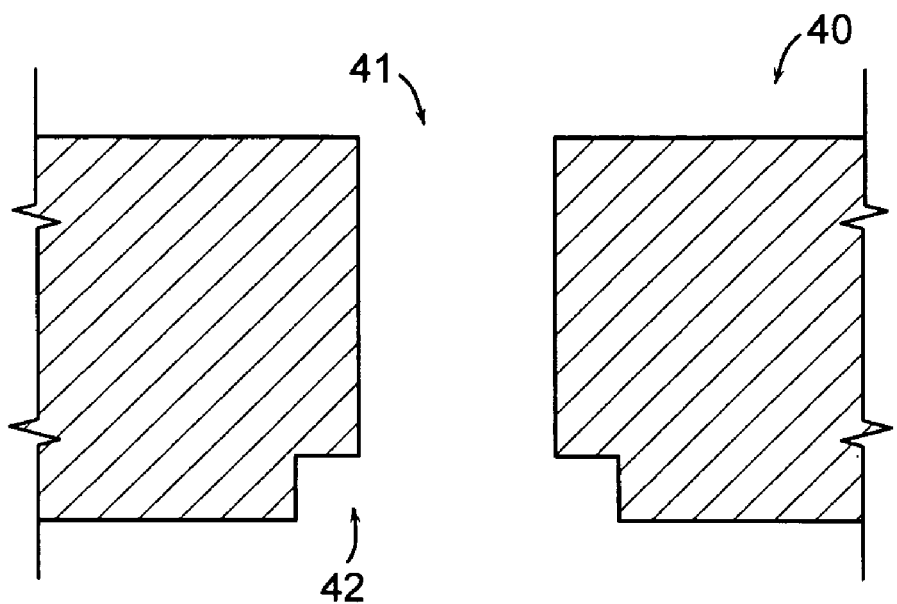
FIG. 4 shows a cross section of a PDMS loader interface according to one embodiment of the present invention.
Figure 4B:
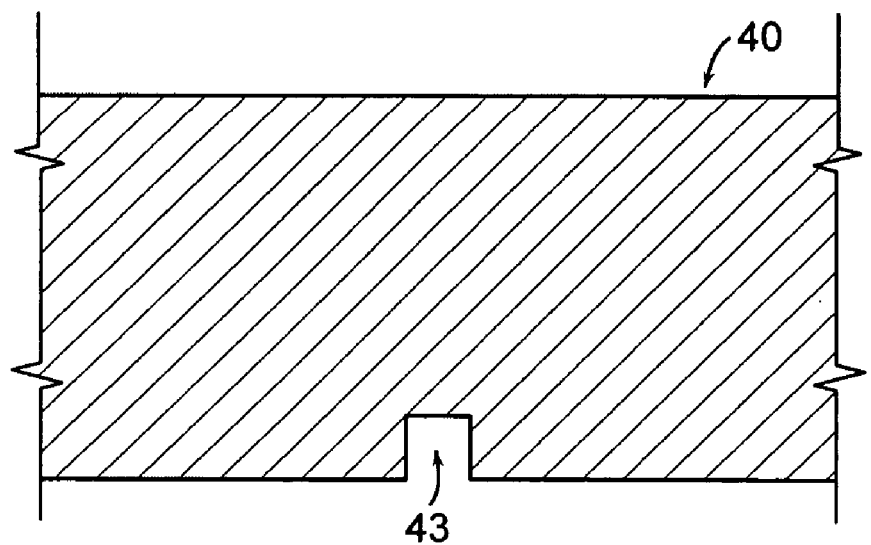

FIG. 4 shows a cross section of a PDMS loader interface 40 having a serpentine geometry 31 as seen in FIG. 3A. FIG. 4A shows a cross-section of the fluid introduction interface which includes a docking port 41 into which a pipette or microsyringe containing the sample fluid may be inserted. At the bottom of the docking port 41 is a sample reservoir 42 which holds a volume of sample fluid for delivery into the microfluidic channels of the fluid access structure. FIG. 4B shows a cross-section through a microfluidic channel 43 which overlays the openings of the sample wells in the serpentine geometry 31 shown in FIG. 3A. Thus, sample fluid from a pipette or microsyringe in the docking port 41 is delivered via the sample reservoir 42 to the microfluidic channel 43. As the sample fluid travels down the channel 43 and passes over the opening of a sample well, it is wicked into the sample well by capillary action and the sample well is populated with a volume of the sample fluid. If the sample fluid is provided with too much pressure, some fluid may escape the reservoir 42 or channel 43 and cause cross-contamination (cross-talk).

A PDMS loader interface can conveniently be produced by casting polymer resin on a mold mask having the desired features and geometry. For example, a prototype interface can be produced in PDMS resin by using stereolithography to convert three-dimensional CAD data into a series of very thin slices. A laser-generated ultraviolet light beam traces each layer onto the surface of the liquid polymer, forming and hardening each layer until the complete, full-size prototype is formed. Another technique for forming a polymer-based loader interface may use ultraviolet lithography to develop an SU-8 photo resist structure. It may be useful to experimentally vary the ratio of resin base to developer, as well as the settling and curing times and temperatures in order to remove a cast interface from its mold without damage. In general, slower curing at lower temperature may work better, as higher temperature curing may cause the molded interface to be too brittle. Access ports for the fluid introduction mechanism can be molded in, or added after molding by boring, laser machining, punching, or drilling a hot needle.

Although the channels of the loader interface need to be hydrophilic in order to properly transport and deliver the sample fluid, PDMS is naturally hydrophobic and it needs special treatment to become hydrophilic. It is known in the art to treat PDMS with plasma gas to change it from hydrophobic to hydrophilic. One drawback of plasma treatment is that it has been known to degrade over time to return back to its natural state. Another treatment approach is to deposit a hydrophilic coating on the channel surfaces, such as from a solution of polyethylene glycol (PEG). Another possibility is a combined treatment with plasma and PEG. By coating the interior surfaces as with PEG, and then allowing the other surfaces to revert to hydrophobicity or treating these surfaces to render them hydrophobic, a selectively coated elastomer structure results which may be optimal in both ease of loading and prevention of sample crosstalk.

Figure 5:
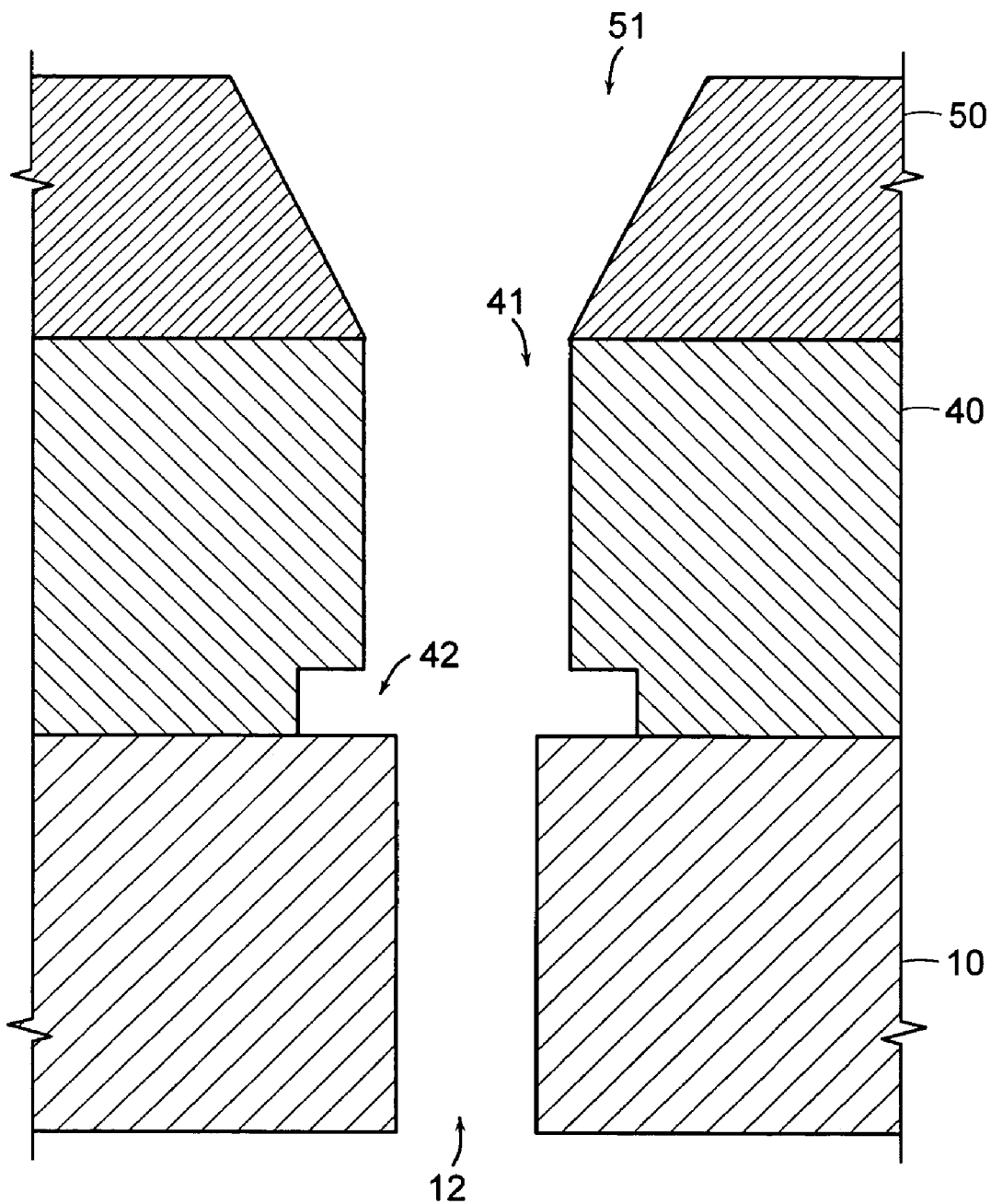
FIG. 5 shows a PDMS loader interface having a hard plastic over-layer according to one embodiment.

In some applications, the soft resiliency of PDMS can cause problems with the fluid introduction mechanism, specifically, the docking ports may be difficult to use. One solution is to overlay the main PDMS structure with a layer of hard material such as hard plastic. FIG. 5 shows such an embodiment in which a hard plastic over-layer 50 lies on top of a PDMS loader interface 40 and sample chip 10. The over-layer 50 includes an oversize docking port 51 which by virtue of its larger size and harder plastic material may act more effectively to receive the end of a pipette or microsyringe delivering the sample fluid.

Figure 6:
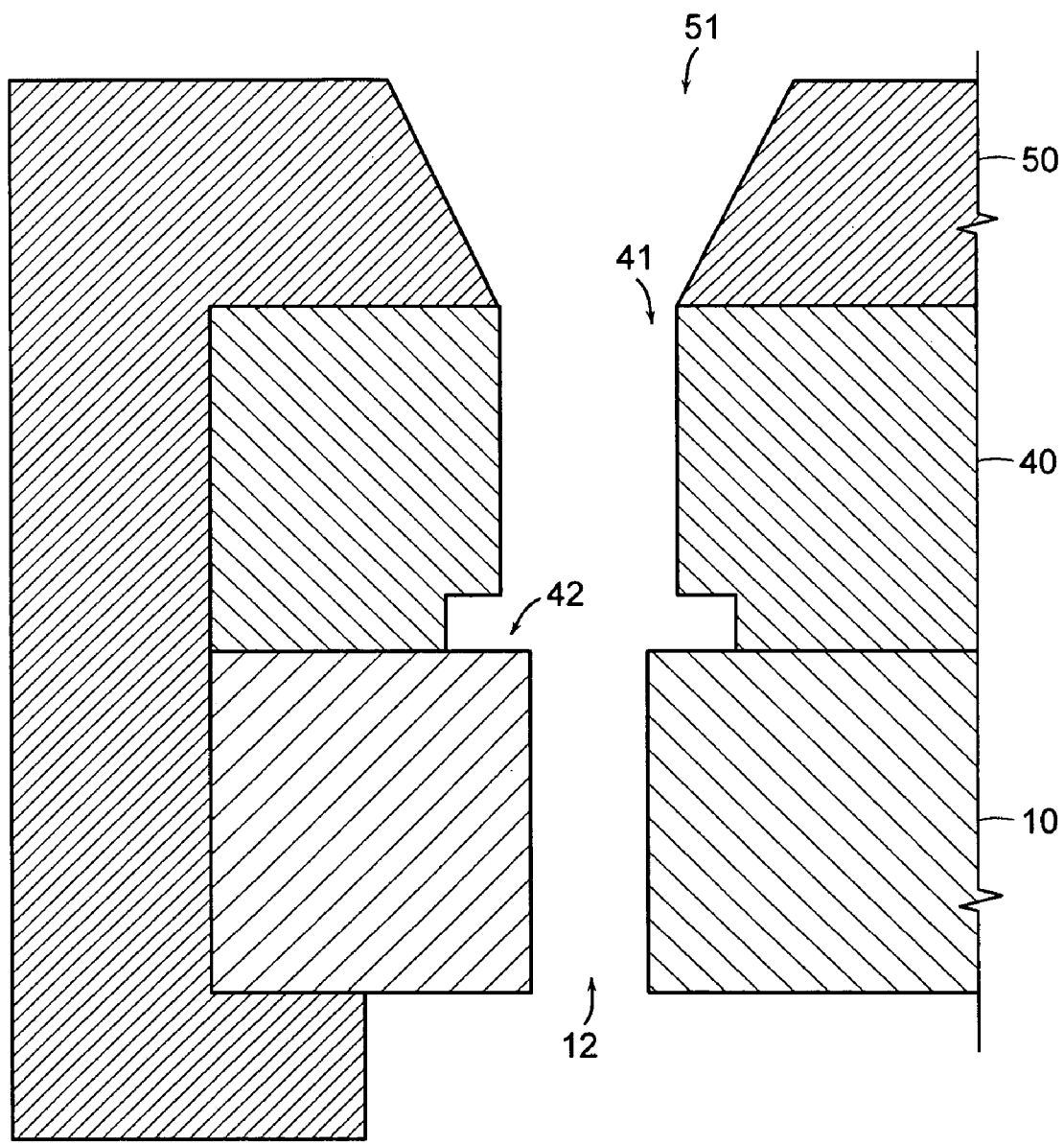
FIG. 6 shows an alternative embodiment of a PDMS loader interface with a hard plastic over-layer.

FIG. 6 shows a further embodiment in which the hard plastic over-layer 50 wraps around the sides of the PDMS loader interface 40 and sample chip 10. This configuration can provide added stability and rigidity to the entire structure and help maintain proper registration (alignment) between the PDMS loader interface 40 and the sample chip 10.

Microfluidic circuits may also be used with other non-through-hole microarrays including nucleic acid hybridization or protein arrays on glass slides. Microfluidic circuit-based fluid access structures may be very effective and may avoid many sample transfer problems such as smearing and blotching of sample fluid across the surface of the sample chip in and around the fluid access region. But microcircuits may wastefully retain some of the sample fluid in an unused dead volume.

Another embodiment may be based on a three-dimensional structure having sub-arrays of sample wells to avoid such dead volume problems. A structure may be adapted to allow simultaneous access to the benefits of a high-density nanoliter array format, and the automated liquid-handling advantages of commercial microtiter plates. Unlike the two-dimensional planar nanoliter sample chip shown in FIG. 1, such embodiments are three-dimensional with sub-arrays of sample wells connected to each other by a structure that is above the plane of the sample wells to facilitate mating with a microtiter plate.

One difficulty in manufacturing such a microtiter-compatible loader interface is that techniques for producing the through-hole nanoliter sample wells require the substrate to be planar. One approach would be to micromold from a suitable polymer a three-dimensional structure compatible with a standard size microtiter plate, the micromolding creating the desired through-hole nanoliter sample well geometry at the correct locations that will be mated with the microtiter plate. Alternatively, an embodiment could be made of multiple components that require assembly in order to generate the required structure for mating with a microtiter plate.

In another specific embodiment, a planar material such as a metal can be etched using conventional photochemical fabrication methods. Then two additional folding steps may be used to produce the required three-dimensional structure. With proper design of the initial planar part, the final fabricated structure can be made to match with a microtiter plate so that sub-arrays of sample wells fit inside the wells of the microtiter plate. Such an embodiment has the advantage of no assembly steps, together with the reliability and precision of photochemical etching, and the ease of forming thin sheet metal.

Figure 7B:
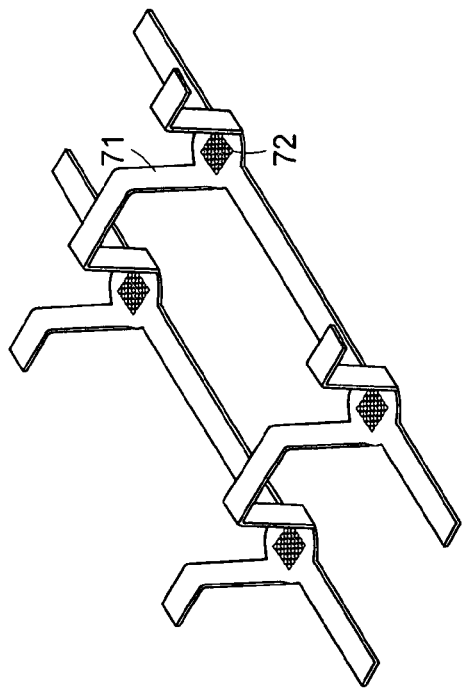
FIG. 7 shows an embodiment in which a portion of the sample chip is folded to enable a sub-array to fit into a sample well of a microplate array.
Figure 7C:
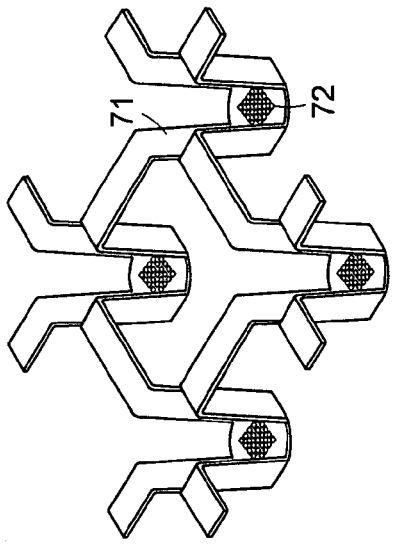
Figures 1, 7A:
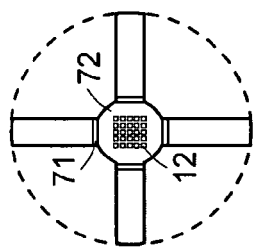
FIG. 1 shows a detailed cut away view of a typical nanoliter sample chip according to the prior art.
Figure 7A:
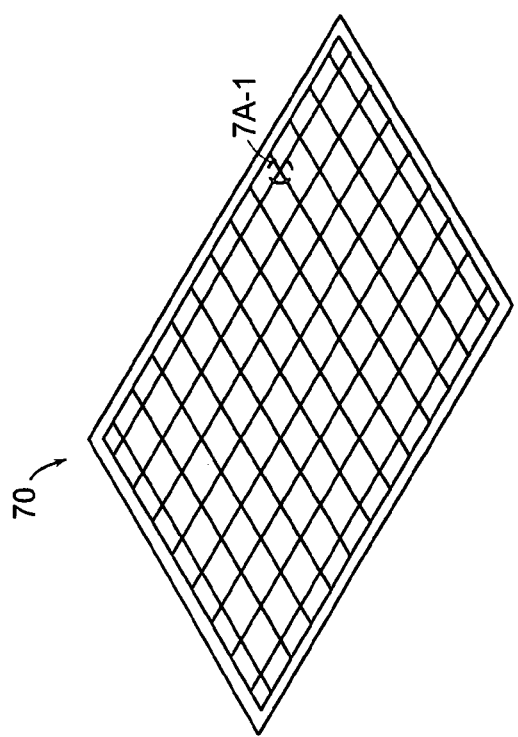

FIG. 7A shows the initial etched planar piece of such a foldable loader interface 70. The structure arms in FIG. 7A will ultimately become the fluid introduction mechanism 71 for introducing the sample fluid in the microtiter plate wells to the fluid access regions 72 that are the nodes in FIG. 7A. The fluid access regions 72 shown in FIG. 7A each have a 5×5 sub-array of 25 through-hole nanoliter sample wells 12 for holding the sample fluid from the fluid access regions that are the microtiter plate wells. The number of sample wells in each sub-array can be easily changed changing the size of the node. If the sample wells are etched at a higher density, 1000 or more sample wells per node is possible. In the interface 70 shown in FIG. 7A, there are 96 nodes (though 384 would be equally easy to manufacture). The work piece shown in FIG. 7A is the interface 70 after photochemical etching, but before forming. The outside frame could be removed before the forming operations, or it could be left attached and used to handle the final part.

The interface 70 shown in FIG. 7A can be finished by using two forming dies that are designed so that they each act on only one direction of the work piece. The first forming operation would then bend the all of the material in one direction—for example, all rows—and leave the material connections on the columns undisturbed. An example of a portion of the resulting work piece is shown in close-up in FIG. 7B. The final forming operation would be orthogonal to the first to then shape all of the columns. A portion of the final formed interface 70 would be as shown in the close-up in FIG. 7C. The final formed interface 70 structure can then match the top of a standard 96-well microtiter sample plate. This allows the nanoliter-size sample wells in the sub-arrays of each fluid access region 72 to be inserted and withdrawn numerous times into the wells of a microtiter plate (as well as various other liquid receptacles) in order to perform various steps in one or more assay operations.

To use such a three-dimensional loader interface, reagents can be pre-formatted into the sample wells of the unformed planar work piece, for example, using pin transfer technology. Alternatively, the interface 70 may first be formed into its final shape, and then inverted to allow reagents to be transferred into the sample wells by pin transfer. The transferred reagents may be fixed onto the walls of the sample wells by drying, and then released upon dipping the interface 70 into a microplate with sample fluid in its wells. In the specific case of PCR, thermal cycling would follow. Wash operations may also be performed by dipping the assembly into a trough or a microplate as for an ELISA. After performing analytical reactions, the plate may be imaged with a laser scanner or high resolution CCD-based system in any available readout mode.

Figure 8:
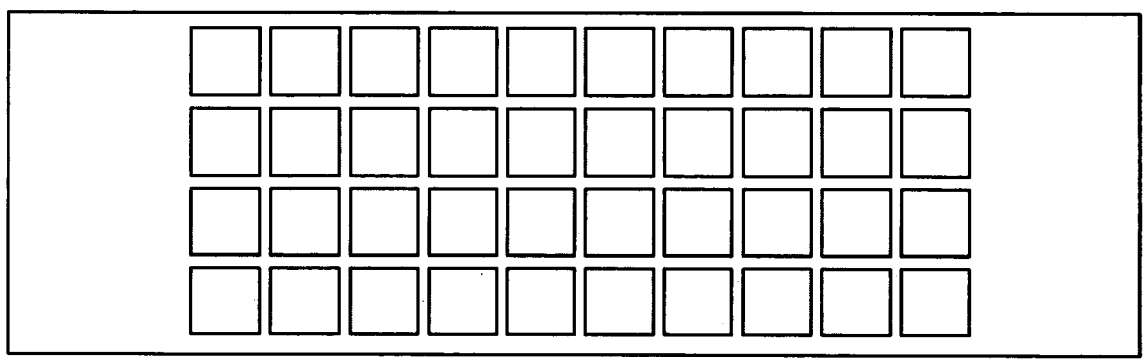
FIG. 8 shows a mask-based embodiment of an interface loader.

There are also a variety of other approaches to provide a sample loader interface to a sample chip. FIG. 8 shows an embodiment in which the fluid access structure and fluid introduction mechanism are integrated together into a mask overlay. A resilient material such as PDMS or silicone divides the surface of the sample chip by creating fluid barriers between sub-arrays. In a mask-type application, it may be useful to place the sample chip onto a hydrophobic surface to prevent the sample fluid from spreading across the bottom of the chip. Alternatively or in addition, various embodiments may employ a mask on the top of the sample chip and a similar corresponding mask on the bottom of the sample chip to avoid cross-talk. Chips intended for use with sub-array masks may also have ridges and other surface features such as spacing arrangements to aid with registration of the mask with the sample chip.

It may also be useful to blot the surface of the chip after adding sample fluid to one of the sub-arrays. For example, a serpentine loader circuit such as shown in FIG. 3A may be laid over the sub-array filled using the mask in order to blot up excess sample fluid. Mask-based embodiments may have difficulties with blotching of the sample fluid leading to cross-talk. The mask is typically removed from the array after blotting and prior to use.

Masking performance may also be improved by using a centrifuge loading technique. In addition or alternatively, sample fluid may be introduced into a masked sub-array by a variety of means including without limitation use of a swab, brush, pad, or sponge.

Figure 9A:
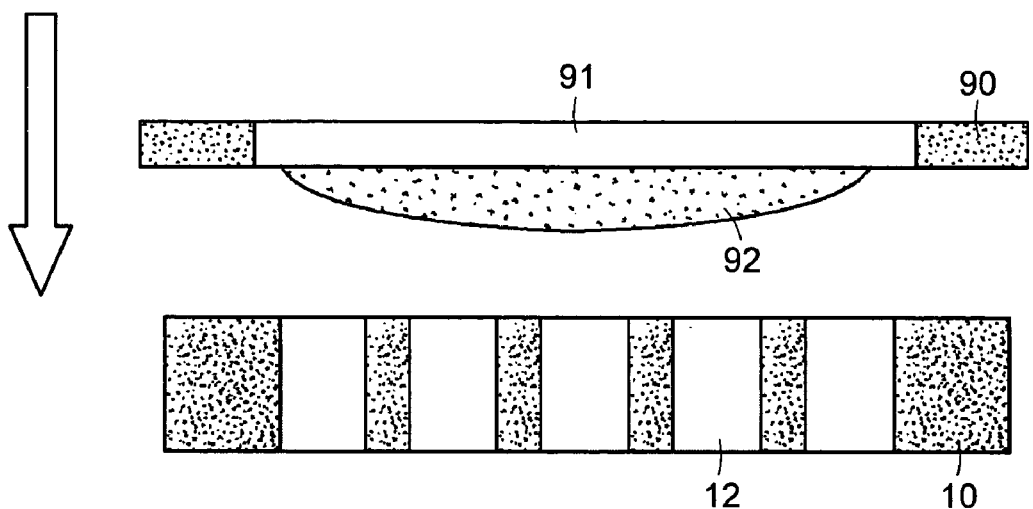
FIG. 9 shows use of contact printing as an interface loader mechanism.
Figure 9B:
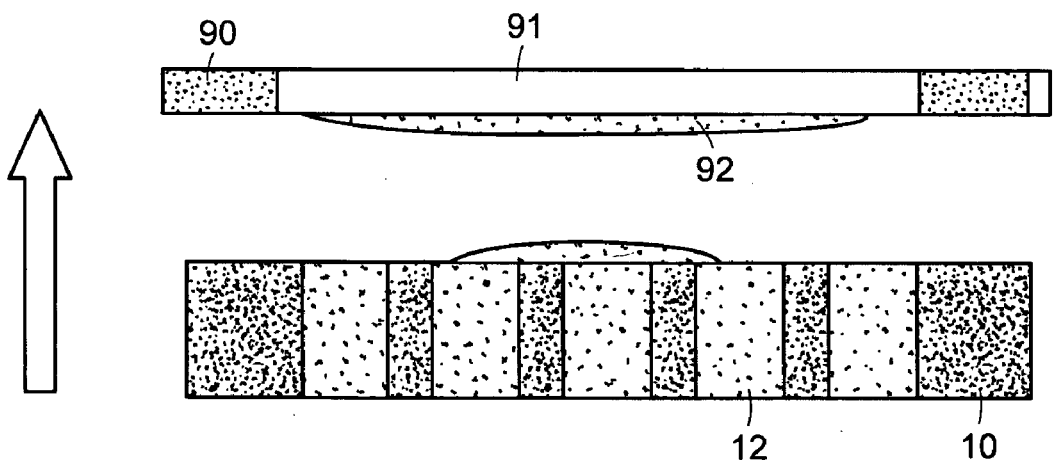

FIG. 9 shows another embodiment in which the sample fluid is transferred to a selected sub-array of sample wells by printing. As shown in FIG. 9A, a hydrophilic island 91 in a background of hydrophobic areas on a printing plate 90 is loaded with sample fluid 92, for example by use of a pipette. The printing plate 90 is then pressed down into contact with the openings of a selected set of sample wells 12 in a sub-array on sample chip 10. Sample liquid is then wicked by capillary action into the selected sample wells 12 and the printing plate 90 is lifted off of the sample chip 10. As with mask-based embodiments, it may then be useful to blot the surface of the sub-array, for example with a serpentine circuit interface, to remove any excess sample liquid from the surface of the sub-array. In some printing-based embodiments, it may be difficult to prevent spreading of the printed sample fluid which could lead to cross-talk. Other potential problems include difficulties aligning the printing plate 90 with the sample chip 10, the multi-step nature of the printing process, and general messiness in the process.

Transferring sample fluid by dragging a hanging drop across the surface openings of selected sample wells may be useful either in combination with various of the above embodiments, or on its own. A pipetter, capillary tube, microsyringe, cannula, pin, or the like may be used to dispense and drag droplets across selected sub-arrays. This may be aided by use of a liquid handling station such as a reformatter, BioMek™ (marketed by Beckman Coulter of Fullerton, Calif.), or other commercial system. For example, a sample chip may be positioned beneath an array of hanging drops in a jig that confines the movement of the sample chip within a defined region in a plane, such as a 4.5 mm square. The sample chip is then moved beneath the hanging drops to distribute sample fluid into the selected sample wells. Transferring sample fluid to a nanoliter sample chip by hanging drops is described in U.S. patent application Ser. No. 09/850,123, filed May 7, 2001, and incorporated herein by reference.

Other non-contact techniques for transferring sample fluid to selected sample wells may be useful either in combination with various of the above embodiments, or on its own. For example, focused non-contact drop dispensing (drop spraying) may be used to direct sample liquid into sample wells. The hanging droplet may be dragged to a dedicated or unused area of the array or sub-array to facilitate removal of excess sample. A non-contact dispensing system is available from LabCyte of Sunnyvale, Calif.

FIG. 10 shows an embodiment in which a porous membrane serves as an interface loader mechanism. In the embodiment shown, microporous membrane 100 has internal unidirectional pores having hydrophilic surfaces. The outer surfaces 101 of the membrane are patterned to be generally hydrophobic with hydrophilic areas that correspond to the openings of the selected sample wells 12 in the sub-array on sample chip 10.

Such a porous membrane 100 may be attached to the sample chip 10 by a variety of different means, for example, by a wax. The specific attachment mechanism should prevent cross-talk of sample fluid beyond the sub-array defined by the membrane 100, while allowing for easy removal of the membrane after sample fluid has been added to the sample wells 12 in the sub-array. In addition or alternatively, the membrane 100 can be placed in a flexible frame that fits over the sample chip 10 to ensure proper alignment with the sub-array sample wells 12 into which sample fluid is to be dispensed.

As shown in FIG. 10A, membrane 100 is laid on top of the sample chip 10 such that the hydrophobic surface 40 of the chip is in contact with the patterned hydrophobic outer surface 101 of the membrane. Sample fluid is dispensed onto the top of the membrane 100 and wicked into the interior pores of the membrane by capillary action. As additional sample fluid is dispensed on top of the membrane, the liquid moves through the interior pores of the membrane and cannot pass through the hydrophobic regions of the outer surface 101 of the membrane (which additionally lies against corresponding portions of the hydrophobic surface 40 of the sample chip 10). But the sample fluid can and does pass through the hydrophilic portions of the outer surface 101, which are patterned to correspond to the openings of the selected sample wells 12 in the sub-array. As the sample fluid starts to emerge from hydrophilic regions in the bottom of the membrane 100, the liquid comes into contact with and wets the hydrophilic surface of the inside walls of the sample wells 12. This causes the sample fluid to be drawn out of the membrane 100 by capillary action and into the interior volumes of the sample wells 12 until they are filled.

After sufficient time, the membrane 100 can be peeled away from the sample chip 10 as shown in FIG. 10B such that the shear force breaks the fluid bridge between the sample fluid remaining in the membrane 100 and the sample fluid in the sample wells 12. The membrane 100 can then be discarded and the sample chip 10 is ready for use.

The total volume of sample fluid dispensed onto the top of the membrane 100 should be controlled in order to avoid wetting of the outer surface 40 of the sample chip 10. If the volume of sample fluid that is dispensed exceeds the combined volume of the membrane 100 and the selected sample wells 12, then the outer surface 40 of the sample chip 10 will most likely wet. Dispensing less than this critical volume ensures that the excess fluid remains within the membrane 100 as it is removed from the sample chip 10. Furthermore, the shear force applied to the liquid bridge as the membrane 100 is peeled off minimizes the possibility of chip surface wetting.

Assuming that the dispensing area of the membrane 100 is fixed by the number of sample wells 12 to be addressed in the selected sub-array, dead volumes can be minimized by controlling the thickness of the membrane 100. For example, a 300 $\mu m^2$ 8×8 sub-array of 64 sample wells having individual storage volumes of 25 nanoliters channels has a total combined volume of 1.6 microliters. If the membrane is 250 $\mu m$ thick, then approximately 3 microliters of sample fluid needs to be loaded into the membrane in order to deliver 1.6 microliters to the sub-array. This means approximately 50% of the sample fluid is wasted in dead volume (1.4 microliters).

Membrane-based interface loaders accommodate different automatic or hand-dispensing mechanisms including pipettes or syringes with cannula. The membrane can be partitioned in various ways to ensure that sample fluid passes only into a given selected sub-array of sample wells. For example, a large number of unidirectional pores may connect the upper and lower surfaces of the membrane so that sample fluid is transferred substantially perpendicularly to these bounding surfaces, ensuring that sample fluid goes only to sample wells directly beneath the dispenser.

Alternatively, the membrane may use blocking of pores in a pattern that is the negative of the sample fluid distribution pattern applied to the sample chip. For example, all the pores in the membrane could be blocked by a hydrophobic epoxy except for a small area into which the sample fluid is dispensed. This embodiment does not necessarily require unidirectional pores.

There are several membrane attributes that would be desirable. These include:
  High porosity to ensure transfer to all the sample wells of the sub-array
  Thick and durable enough to be applied and removed easily
  Blotters should not tear when wet and should absorb so that excess sample fluid is contained and does not cross into another sub-array.
  Unidirectional pores to ensure directional flow of sample fluid from one side of the membrane to the other and into the sample wells of the sub-array.
  Patterns of hydrophobic and hydrophobic surface coatings to facilitate the movement of sample fluid through the membrane into the sample wells of the sub-array.
  Segmentation of the membrane to ensure sample fluid applied to the upper surface of the membrane flows through to a selected subset of underlying sample wells.

One specific embodiment uses track-etched polyester or polycarbonate. Such an embodiment may have internal pores of a defined size range and density, but membrane porosity may be relatively low (5-20%). Such a membrane may be relatively thin, for example, 10-20 μm, and therefore, may be difficult to handle.

Another specific embodiment uses cast membranes-mixtures of cellulose esters (cellulose nitrate and cellulose acetate) which are formed into a fibrous network similar to paper. These membranes have an open cell structure with high porosity (70-80%) and have a broad pore size distribution (e.g., 0.22-5.0 μm) which may enhance fluid passage and distribution to the selected sample wells. These membranes tend to be thicker than track-etched (100-200 μm), which could improve handling characteristics.

Another embodiment uses an Anopore™-aluminum oxide membrane with a relatively high porosity (40-50%) having a honeycomb structure that ensures proper distribution across the sub-array. In this membrane, the pore sizes (20-200 nanometers) may be much smaller than the openings of the sample wells.

Yet another embodiment uses a membrane made of paper or glass microfiber. Such materials come in different grades with different speeds of filtration. Paper filters also come strengthened with resin to enhance durability.

An additional benefit of a membrane loader interface is that it is well-suited for blotting away from the surface of the sample chip any excess sample fluid. But this blotting action should be controlled to prevent the membrane material from pulling sample fluid back out of the loaded sample wells in the sub-array when the membrane is removed. In other embodiments, the membrane may be used as a blotting mechanism to remove excess sample fluid from the surface of the sample chip after the sample wells in the selected sub-array have been loaded by another mechanism, for example, by a microfluidic circuit arrangement.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of storing microfluidic samples, the method comprising:
   providing an array of sample wells for storing microfluidic samples, the sample wells disposed along and open to at least one planar surface;
   positioning a fluid access structure adjacent to one of the at least one planar surfaces, the fluid access structure comprising a microfluidic circuit for distributing the sample fluid to a fluid access region encompassing a subset of the sample wells from the array of sample wells, wherein the microfluidic circuit includes one or more microfluidic channels adapted to overlay openings of the subset of the sample wells, wherein two or more channels of the one or more microfluidic channels span at least two openings of the subset; and
   introducing a sample fluid through the microfluidic circuit to the fluid access region so that the sample wells in the fluid access region are populated with the sample fluid.

2. A method according to claim 1, further comprising providing a fluid access region encompassing the subset of sample wells, wherein the fluid access structure includes a mask to create a barrier between the fluid access region and other regions of the one planar surface.

3. A method according to claim 1, wherein the fluid access structure includes a printing plate.

4. A method according to claim 1, further comprising:
   providing a fluid access region encompassing the subset of sample wells; and
   dragging a drop of the sample fluid over the fluid access region.

5. The method of claim 1, wherein the sample wells are through-holes.

6. The method of claim 1, further comprising flowing fluid from the one channel into the at least two openings.

7. An interface device for storing microfluidic samples in a chip having an array of sample wells, the interface device comprising:
   a fluid access structure comprising a microfluidic circuit for distributing the sample fluid to a subset of sample wells of the array of sample wells, wherein the microfluidic circuit includes microfluidic channels, wherein two or more of the microfluidic channels are adapted to overlay at least two sample wells of the subset of the sample wells.

8. An interface device according to claim 7, wherein the fluid access structure includes a mask to create a barrier between the fluid access region and other regions of the array.

9. An interface device according to claim 7, further comprising:
   a fluid access region encompassing the subset of sample wells; and
   means for dragging a drop of the sample fluid over the fluid access region.

10. An interface device according to claim 7, further comprising a fluid access region encompassing the subset of sample wells, wherein a pipette is provided for introducing a sample fluid to the fluid access region.

11. An interface device according to claim 7, further comprising a fluid access region encompassing the subset of sample wells, wherein the fluid access structure includes a membrane for providing the fluid access region and the means for introducing a sample fluid.

12. An interface device according to claim 11, wherein the membrane includes an outer surface having patterned hydrophobic and hydrophilic regions.

13. The device of claim 7, further comprising means for introducing a sample fluid through the microfluidic circuit to the fluid access region so that the subset of sample wells are populated with the sample fluid.

14. The device of claim 7, wherein the sample wells are through-holes.

15. The device of claim 7, further comprising a chip including the array of sample wells.

16. The device of claim 7, further comprising an array of sample wells disposed along and open to a planar surface, the fluid access structure configured to be positioned adjacent the planar surface such that the one channel overlays at least two of the sample wells.

17. The device of claim 7, wherein the one channel is configured to flow fluid within the channel into the at least two sample wells.

18. A kit for storing microfluidic samples comprising:
the interface device of claim 7; and
a chip containing the array of sample wells.

19. A kit according to claim 18, wherein the interface device further contains a reagent for the wells in the selected subset of sample wells.

20. A kit according to claim 19, wherein the reagent is a dye for staining the sample fluid populated into the subset of wells.

21. An interface device for storing microfluidic samples in a chip having an array of sample wells, the interface device comprising:
a fluid access structure configured to define a fluid access region encompassing a subset of at least two sample wells of an array of sample wells, the fluid access structure adapted for positioning next to a planar surface of the array and including a microfluidic circuit for distributing a sample fluid to the fluid access region, wherein the microfluidic circuit includes microfluidic channels, wherein two or more of the microfluidic channels are adapted to overlay at least two of the sample wells.

22. An interface device according to claim 21, wherein the fluid access structure includes a mask to create a barrier between the fluid access region and the rest of the array.

23. An interface device according to claim 21, wherein the fluid introduction mechanism is adapted for dragging a drop of the sample fluid over the fluid access region.

24. The device of claim 21, further comprising a fluid introduction mechanism for introducing a sample fluid through the microfluidic circuit to the fluid access region so that the subset of sample wells are populated with the sample.

25. The device of claim 21, wherein the sample wells are through-holes.

26. The device of claim 21, further comprising a chip including the array of sample wells.

27. The device of claim 21, further comprising an array of sample wells disposed along and open to a planar surface, the fluid access structure configured to be positioned adjacent the planar surface such that the one channel overlays at least two of the sample wells.

28. The device of claim 21, wherein each channel is configured to flow fluid within the channel into the at least two sample wells.

29. A kit for storing microfluidic samples comprising:
the interface of claim 21; and
a chip containing the array of sample wells.

30. A kit according to claim 29, wherein the interface device further contains a reagent for the wells in the selected subset of sample wells.

31. A kit according to claim 30, wherein the reagent is a dye for staining the sample fluid populated into the subset of wells.

32. A method of storing microfluidic samples, the method comprising:
providing a chip having an array of sample wells for storing microfluidic samples, the sample wells open to at least one planar surface;
positioning a fluid access structure adjacent to one of the at least one planar surfaces of the chip, the fluid access structure configured to define a fluid access region encompassing a subset of sample wells, and facilitate providing a fluid access region to a selected subset of sample wells;
and introducing a sample fluid to the fluid access region so that the sample wells are populated with the sample fluid;
wherein providing a fluid access region includes folding a portion of the chip.

33. An interface for storing microfluidic samples in a chip having an array of sample wells, the interface comprising:
a fluid access structure configured to define a fluid access region encompassing a subset of the sample wells; and
means for introducing a sample fluid to the fluid access region so that the sample wells in the selected subset are populated with the sample fluid;
wherein the means for providing a fluid access region includes means for folding a portion of the array.

34. An interface for storing microfluidic samples in a chip having an array of sample wells, the interface comprising:
a fluid access structure configured to define a fluid access region encompassing a subset of sample wells; and
a fluid introduction mechanism for introducing a sample fluid to the fluid access region so that the sample wells in the selected subset are populated with the sample fluid;
wherein the fluid access structure is adapted for positioning next to a planar surface of the array to provide the fluid access region; and
wherein the fluid access structure is adapted to fold a portion of the array to provide the fluid access region.

35. A through-hole array comprising:
a plurality of sub-array nodes, each sub-array node including a sub-array of through-holes; and
a plurality of foldable arms connecting adjacent sub-array nodes.

36. The through-hole array of claim 35, wherein the plurality of sub-array nodes and the plurality of foldable arms are formed from a single sheet of material.

37. The through-hole array of claim 36, wherein the material is a metal.

38. The through-hole array of claim 35, wherein the plurality of sub-array nodes is sized for insertion into a microtiter plate.

39. The through-hole array of claim 38, wherein the microtiter plate is a 96-well microtiter plate.

40. A method of transferring one or more liquid samples residing in one or more wells of a microtiter plate to a through-hole array, the method comprising:

providing a through-hole array including:

a plurality of sub-array nodes, each sub-array node including a sub-array of through-holes; and a plurality of foldable arms connecting adjacent sub-array nodes;

folding one or more of the plurality of foldable arms to produce a three-dimensional structure wherein the inter-node spacing substantially matches the inter-well spacing of the microtiter plate; and dipping the sub-array nodes in the wells of the microtiter plate;

thereby transferring one or more liquid samples residing in a microtiter plate to a through-hole array.

* * * * *